US012614644B2

(12) United States Patent
Althouse et al.

(10) Patent No.: US 12,614,644 B2
(45) Date of Patent: Apr. 28, 2026

(54) IN-VESSEL CORE COMPONENT HANDLING SYSTEMS AND METHODS

(71) Applicant: TerraPower, LLC, Bellevue, WA (US)

(72) Inventors: Daniel R. Althouse, Rochester, NY (US); Nickolas Clark, Lake Stevens, WA (US); Jeffrey Derenthal, Seattle, WA (US); Thomas Ekstrom, Bothell, WA (US); Victoria Graham, Kenmore, WA (US); Joseph Heath, Lynnwood, WA (US); Matthew M. Mareka, Mystic, CT (US); Bryan W. Sardo, Old Lyme, CT (US); Nathan Smith, Duvall, WA (US); Zachariah Snyder, Seattle, WA (US); Olivera Ulicevic, Chicago, IL (US)

(73) Assignee: TERRAPOWER, LLC, Bellevue, WA (US)

( * ) Notice: Subject to any disclaimer, the term of this patent is extended or adjusted under 35 U.S.C. 154(b) by 305 days.

(21) Appl. No.: 18/361,781

(22) Filed: Jul. 28, 2023

(65) Prior Publication Data

US 2024/0312655 A1 Sep. 19, 2024

Related U.S. Application Data

(60) Provisional application No. 63/393,430, filed on Jul. 29, 2022.

(51) Int. Cl.
G21C 19/26 (2006.01)
B25J 9/10 (2006.01)
(Continued)

(52) U.S. Cl.
CPC .............. G21C 19/26 (2013.01); B25J 9/102 (2013.01); B25J 13/085 (2013.01); (Continued)

(58) Field of Classification Search
CPC ...... G21C 19/26; G21C 19/105; G21C 19/16; G21C 19/18; G21C 19/20; G21C 19/205; (Continued)

(56) References Cited

U.S. PATENT DOCUMENTS

| 5,098,642 A | * | 3/1992 | Gaubatz | ................. | G21C 17/06 235/462.14 |
| 2022/0051827 A1 | | 2/2022 | Cheatham, III et al. | | |

FOREIGN PATENT DOCUMENTS

| FR | 2953319 A1 | * | 6/2011 | ........... G21C 19/205 |
| GB | 1112384 A | | 5/1968 | |

OTHER PUBLICATIONS

English translation of FR-2953319-A1 (Year: 2025).*
(Continued)

*Primary Examiner* — Angelo Trivisonno
(74) *Attorney, Agent, or Firm* — FisherBroyles, LLP; Jeremy P. Sanders

(57) ABSTRACT

An in-vessel fuel transfer machine may be permanently affixed to a nuclear reactor and remain in place during power operations. The in-vessel fuel transfer machine may include a pantograph machine that positions a grapple in order to access any fuel socket location within the core and move any of the core assemblies between the core, an in-vessel fuel storage area, and a fuel elevator. The grapple may be positioned through a combination of movements, such as, rotating a rotating plug assembly, rotating the in-vessel fuel transfer machine, extending the pantograph arms, and shuttling the grapple along a leg. The grapple may be compliant to accommodate deformed core assemblies and may be configured to pivot to more closely align to an eccentric core assembly handling socket or be moveable in a horizontal plane to accommodate a deformed core assembly during insertion or withdrawal.

22 Claims, 15 Drawing Sheets

(51) Int. Cl.
    *B25J 13/08*      (2006.01)
    *B25J 15/00*      (2006.01)
    *G21C 19/105*    (2006.01)
    *G21C 19/16*     (2006.01)
    *G21C 19/18*     (2006.01)

(52) U.S. Cl.
    CPC ....... *B25J 15/0004* (2013.01); *B25J 15/0047*
        (2013.01); *G21C 19/105* (2013.01); *G21C*
        *19/16* (2013.01); *G21C 19/18* (2013.01)

(58) Field of Classification Search
    CPC ...... B25J 9/102; B25J 13/085; B25J 15/0004;
                   B25J 15/0047; Y02E 30/30
    See application file for complete search history.

(56)                References Cited

OTHER PUBLICATIONS

Kim ("Design Characteristics of Pantograph Type In-Vessel Fuel Handling System in SFR") Transactions of the Korean Nuclear Society Autumn Meeting Gyeongju, Korea, Oct. 25-26, 2012 (Year: 2012).*
International Application No. PCT/US2023/071288 International Search Report and Written Opinion mailed Nov. 27, 2024.

* cited by examiner

100

120

118

120

102

104

116

124

106

112

110

108

122

200

216

214

202

208

116

116

204

206

210

212

ROTATIONAL AXIS OF RPA
504

CENTER OF CORE
502

IVTM 116

IVTM
ROTATION AXIS 404

FUEL ELEVATOR 208

ABOVE CORE IN-VESSEL
STORAGE (IVS)
206

ABOVE CORE IN-VESSEL
STORAGE (IVS)
206

ELTA LOCATIONS
8 PLACES

CRDM LOCATIONS
9 PLACES

RPA
202

Top View

116

TOP OF
TELESCOPING
TUBE

206

408b

302

304

408a

208

GRAPPLE AND
TOP OF CORE

C                    C

304

808

810

802

802

810

806

804

804

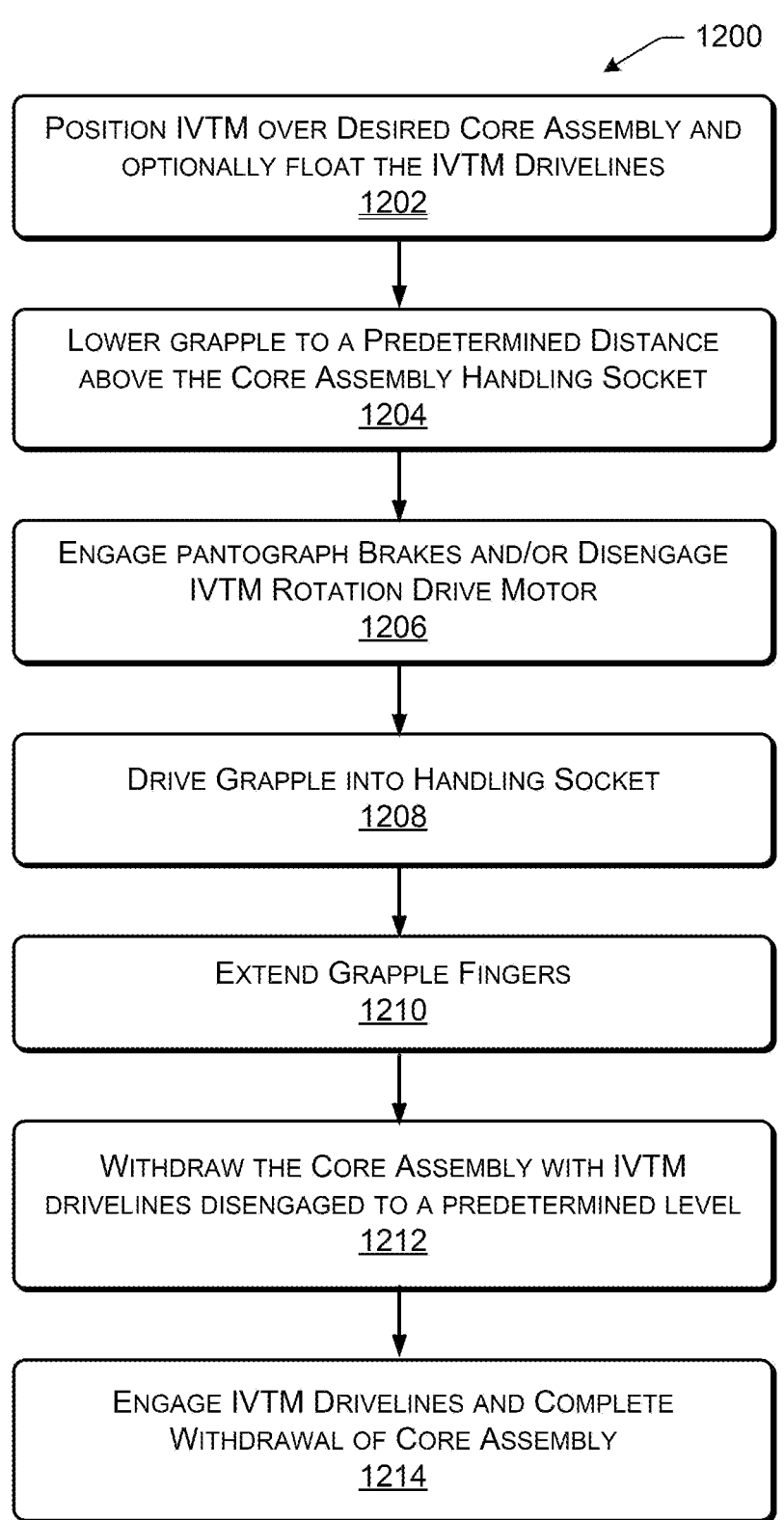

— 1200

POSITION IVTM OVER DESIRED CORE ASSEMBLY AND
OPTIONALLY FLOAT THE IVTM DRIVELINES
1202

LOWER GRAPPLE TO A PREDETERMINED DISTANCE
ABOVE THE CORE ASSEMBLY HANDLING SOCKET
1204

ENGAGE PANTOGRAPH BRAKES AND/OR DISENGAGE
IVTM ROTATION DRIVE MOTOR
1206

DRIVE GRAPPLE INTO HANDLING SOCKET
1208

EXTEND GRAPPLE FINGERS
1210

WITHDRAW THE CORE ASSEMBLY WITH IVTM
DRIVELINES DISENGAGED TO A PREDETERMINED LEVEL
1212

ENGAGE IVTM DRIVELINES AND COMPLETE
WITHDRAWAL OF CORE ASSEMBLY
1214

Fig. 12

IN-VESSEL CORE COMPONENT HANDLING SYSTEMS AND METHODS

GOVERNMENT LICENSE RIGHTS

This invention was made with government support under DOE Cooperative Agreement No. DE-NE0009054 awarded by the U.S. Department of Energy. The government has certain rights in the invention.

FIELD OF THE DISCLOSURE

This disclosure is directed to an in-vessel core component handling system that is configured to insert, remove, and reposition core components, such as fuel assemblies, reflectors, absorbers, and other core components.

BACKGROUND

Nuclear reactors typically have a way to move core components within the core, such as for fuel loading and unloading, for repositioning reflectors or neutron absorbers along with other core components. A fuel handling machine is typically inserted into the core during power shutdown in order to remove fuel rods and to refuel the nuclear reactor. Accordingly, it becomes necessary to shut down a nuclear reactor in order to refuel, or reposition core components. The outage time required to shuffle or remove core components increases capital costs, operation costs, and maintenance costs.

Furthermore, core components may become deformed due to exposure to the nuclear core environment. For example, thermomechanical stresses within the core result in microstructure deformities resulting in macroscopic response. The response of core components may include creep, swelling, cracking, and fuel-clad interaction. A fuel handling machine must be able to account for the deformation of core components to reduce or eliminate additional eccentric loading on the core components during removal from the nuclear core.

It would be advantageous to provide a fuel handling machine that addresses these deficiencies and promotes a more efficient nuclear reactor with reduced power outages. These, and other advantages, will become readily apparent to those of skill in the art by reference to the following description and figures.

SUMMARY

According to some embodiments, an in-vessel fuel transfer machine includes a drive assembly, the drive assembly configured to be mounted above a reactor head of a nuclear reactor; a telescoping guide tube operatively coupled to the drive assembly and extending through the reactor head; a pantograph mechanism coupled to the telescoping guide tube, the pantograph mechanism comprising: an upper arm having a first upper arm end and a second upper arm end, the upper arm operatively coupled to the telescoping guide tube at the first upper arm end; a lower arm having a first lower arm end and a second lower arm end, the lower arm operatively coupled to the telescoping guide tube at the first lower arm end; a leg coupled to the second upper arm end and the second lower arm end, the leg defining a pathway; and a grapple coupled to the leg, the grapple configured to travel on the pathway.

In some cases, the in-vessel fuel transfer machine further includes a pantograph driveline selectively engageable with the upper arm and the lower arm, the drive assembly may be configured to rotate the upper arm and lower arm away from the telescoping guide tube.

In some examples, the leg is configured to be moved away from the telescoping guide tube by actuation of the upper arm and lower arm, wherein the leg is further configured to remain parallel with the telescoping guide tube during actuation of the upper arm and the lower arm. In some cases, the leg remains vertical, or substantially vertical, while the pantograph is moved and manipulated.

In some examples, the grapple is configured to float by disengaging the pantograph driveline to allow the grapple to move in a horizontal plane in response to external forces applied to the grapple. The external forces may be applied by a deformed core assembly and the grapple may be allowed to float to reduce forces from a deformed core assembly on adjacent core assemblies during insertion or withdrawal into a core socket.

According to some embodiments, the grapple comprises a plurality of fingers that are biased in an orientation that is parallel to the leg. For example, the fingers may be biased to point downwardly to facilitate their insertion into a core handling socket of a core assembly.

The grapple may include a shaft that is configured to be slideable to expand the plurality of fingers outwardly. For instance, the shaft may slide across a cam that expands the fingers once the fingers are within the core handling socket.

In some instances, the telescoping guide tube defines a longitudinal axis, and a rotation motor may be configured to rotate the in-vessel fuel transfer machine about the guide tube longitudinal axis.

According to some embodiments, the pantograph is configured to remain within a reactor vessel during power operation of the nuclear reactor. For instance, the pantograph may be permanently installed at a location that places the pantograph at least partially submerged within a pool of sodium while a drive assembly operatively coupled to the pantograph may remain above the sodium, such as above the reactor head.

In some cases, a force sensor is coupled to the grapple and is configured to sense one or more forces applied to the grapple. An encoder may be coupled to the drive assembly and configured to operate the drive assembly to move the pantograph in response to one or more forces applied to the grapple. The encoder may be configured to move the grapple to reduce forces applied to the grapple by a deformed core assembly. For example, as a deformed core assembly is withdrawn from a core socket, a bowed core assembly will impart a side load onto the grapple. In response, the grapple may move laterally (e.g., in a horizontal plane) to accommodate the side load and the bowed core assembly. The grapple may freely float and move in response to the applied force, or in some cases, the applied force may be determined by a sensor and the grapple may be moved by the IVTM drive assembly to accommodate the bowed core assembly.

In some cases, the encoder is configured to move the grapple in a circuitous path during withdrawal of a deformed core assembly from a core socket within a core of the nuclear reactor.

The grapple may further include a ball joint to allow the grapple to freely pivot within a predetermined angular limit, such as 0.25°, 0.5°, 0.675°, 0.75°, 10, or more.

In some examples, a ball screw actuator is provided to extend or retract the telescoping guide tube. The ball screw actuator may be mounted above the reactor head, and the ball screw actuator may include a sliding shaft penetrating the reactor head at a penetration and a sliding shaft seal at the penetration.

According to some embodiments, a method of withdrawing a deformed core assembly from a nuclear reactor core includes the steps of positioning a grapple of a pantograph in-vessel fuel transfer machine above a selected core assembly; disengaging a pantograph driveline and allowing the pantograph to float in a horizontal plane; driving the grapple into a handling socket of the selected core assembly; extending grapple fingers inside the handling socket; withdrawing the selected core assembly from the nuclear reactor core while the pantograph driveline is disengaged; and engaging, after a predetermined withdrawal distance, the pantograph driveline and completing withdrawal of the selected core assembly.

The method may include the step of withdrawing the selected core assembly from the nuclear reactor core comprises moving the grapple along a circuitous path.

The method may further include the step of determining a side load on the grapple from the deformed core assembly.

The method may include the step of moving the grapple in a horizontal plane based at least in part on the side load.

The method may include identifying the deformed core assembly by a mechanical core component identification system, which may include engaging a pawl with an outer periphery of the core assembly; and rotating the core assembly. The pawl may follow the shape of an outer periphery of the core assembly and determine a unique identifier associated with the core assembly based at least in part on the shape of the outer periphery of the core assembly. The pawl may follow a series of surface features formed into the surface of the outer periphery of the core assembly. The core assembly may have surface features formed as grooves, protrusions, lands, valleys, bumps, indentations, or some other surface feature that moves the pawl to generate a signal indicative of the surface condition that can be used to determine a unique identifier of the core assembly. The core assembly may have a longitudinal axis and the pawl may be moved by the surface features in a radial direction with respect to the longitudinal axis.

The disclosed methods, operation of the IVTM, operation of the grapple, and other movements may be performed under control of one or more computers that may be programmed with instructions, that when executed, cause the systems to perform the methods and steps described herein.

The foregoing and other features and advantages will become further apparent from the following Detailed Description, read in conjunction with the drawings.

BRIEF DESCRIPTION OF THE DRAWINGS

FIG. 12 illustrates a process flow diagram for withdrawing a deformed core assembly, in accordance with some embodiments.

DETAILED DESCRIPTION

This disclosure generally relates to method and systems for handling core components within a nuclear reactor. In some cases, a fuel handling machine is disposed within the reactor vessel and is configured to insert, remove, and shuffle core components. The fuel handling machine may be a pantograph configuration that allows radial movements, axial movements, and rotational movements about one or more axes. As used herein, a pantograph refers to a mechanical linkage based on parallelograms in which opposing arms remain parallel even though the angles forming the parallelogram structure may change.

Figure 1:
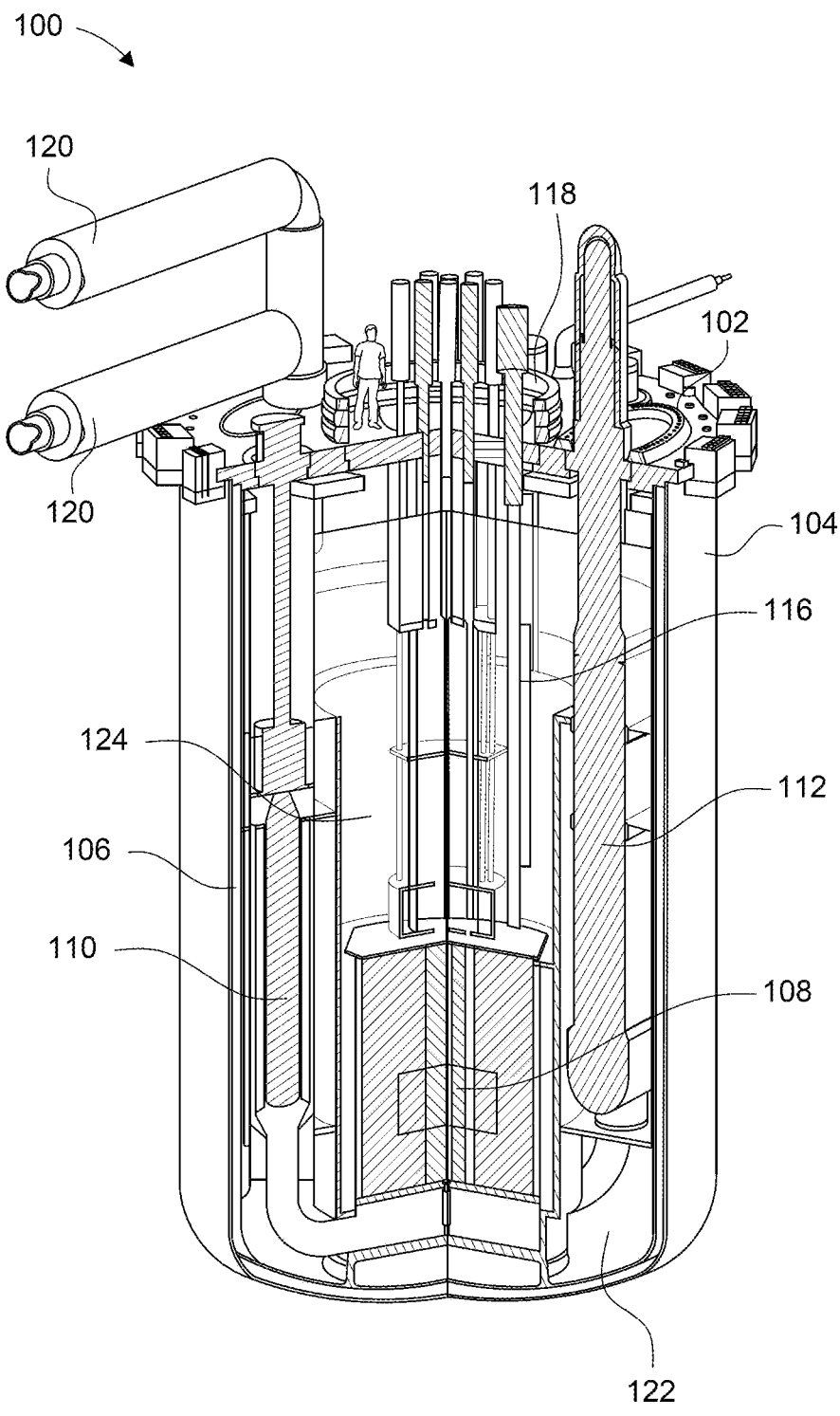
FIG. 1 illustrates various components of a nuclear reactor, according to some embodiments.

Referring to FIG. 1, many of the components and subassemblies of a nuclear reactor 100 are illustrated. For example, a reactor head 102, reactor and guard vessel 104, but also illustrates many ancillary reactor components such as structural members, flanges, cover plates, piping, railing, framing, connecting rods, and supports. While the illustrated nuclear reactor 100 is a sodium fast reactor (SFR), it should be appreciated that the components and embodiments described herein could be applied to any suitable reactor configuration. For example, many of the systems, components, assemblies, and sub-assemblies described herein could be utilized in any reactor that utilizes core components that are inserted into, removed from, or shuffled within, the reactor core.

The nuclear reactor 100 is designed to hold a number of nuclear fuel pins (not shown) in a reactor core 108 located at the bottom of the reactor and guard vessel 104. The reactor head 102 seals the radioactive materials within the reactor vessel 106 and guard vessel 104. In the embodiment shown the reactor core 108 can only be accessed through the reactor head 102. For example, an in-vessel fuel handling machine 116 is provided. The fuel handling machine 116 allows fuel pins and other core components and instruments to be lifted from the core 108 and removed from the vessel 106 via a set of large and small rotating plugs 118 located in the reactor head 102. This design allows the reactor vessel 106 to be unitary and without any penetrations.

Sodium, which is a liquid at the nuclear reactor operating temperatures, is the primary coolant for removing heat from the reactor core 108. The reactor vessel 106 is filled to some level with sodium which is circulated through the reactor core 108 using pumps 110. In some embodiments, two or more sodium pumps 110 are provided, which may be electromagnetic pumps. In some cases, one or more pumps 110 may include an impeller which may extend through the reactor head 102 to a motor located above the reactor head 102.

In some embodiments, the pumps 110 are configured to circulate the sodium through one or more intermediate heat exchangers 112 located within the reactor vessel 106. Sodium from the cold pool 122 is pumped up into the core 108 where it becomes heated from the nuclear fission reactions. The heated sodium travels up out of the core and into the hot pool 124. The sodium flows upwardly by natural circulation as heated sodium has a lower density than cold sodium in the cold pool, and also by forced pressure from the one or more pumps 110. The heated sodium in the hot pool is drawn into the intermediate heat exchangers 112 which transfer heat from the primary sodium coolant to a secondary coolant. Fresh secondary coolant is piped through the reactor head 102 via one or more heat transport loop pipes 120 to the intermediate heat exchangers 112 where it is heated. Heated secondary coolant then flows out of the reactor head 102 through the heat transport loop piping 120. In some embodiments, the heated secondary coolant is used to generate steam which transferred to a power generation system. The secondary coolant may be a sodium coolant or a salt coolant such as a magnesium sodium coolant.

Figure 2:
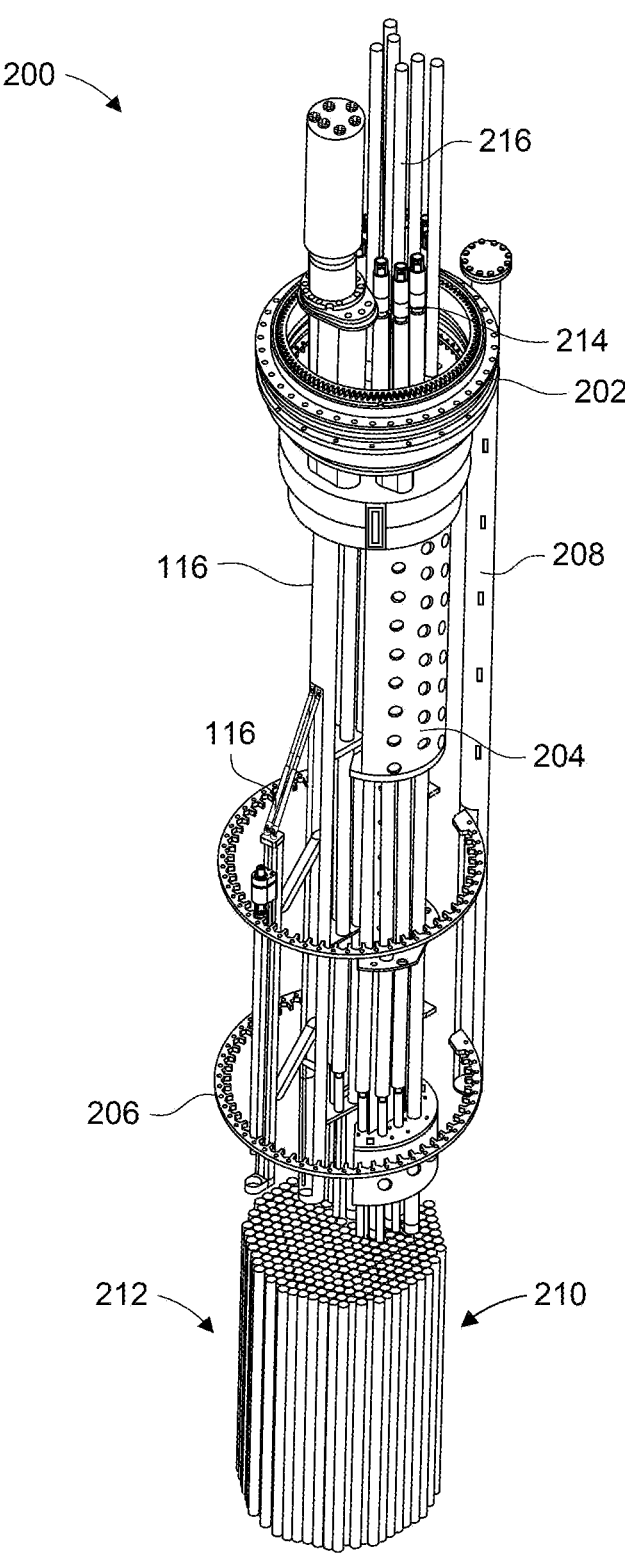
FIG. 2 illustrates an in-vessel fuel handling machine, in accordance with some embodiments.

FIG. 2 illustrates an example of an in-vessel fuel handling system 200 that includes an in-vessel transfer machine 116 ("IVTM"). According to some embodiments, the in-vessel fuel handling system 200 comprises an IVTM of the pantograph type and further may include a rotating plug assembly 202 ("RPA"), or just "rotating plug," an upper internal structure 204 ("UIS"), a fuel transfer port, and in-vessel storage system 206.

The UIS 204 may be coupled to the underside of the rotating plug 202 and provides support for many of the components extending below or through the rotating plug 202. The UIS 204 may have a slot formed vertically therethrough to provide clearance for the IVTM 116.

In some cases, the IVTM 116 can exchange fuel assemblies and may store spent assemblies and other core components in the in-vessel storage system 206 ("IVS") which can ultimately be removed from the reactor vessel by a fuel elevator 208. The fuel elevator may be any suitable configuration, and may be positioned about the reactor vessel by the rotating plug assembly 202. In some cases, the rotating plug 202 is configured to revolve around a central axis, and any components that are affixed to the rotating plug 202, such as the fuel elevator 208, can be moved about the reactor vessel by the rotating plug 202. The fuel elevator 208, in some cases, is configured to be able to selectively couple to a core component stored within the IVS 206 and relocate the core component to a location above the reactor head 102.

In some embodiments, the fuel elevator 208 is stationary and the IVTM 116 can selectively deposit fuel assemblies and other core components into the fuel elevator 208 as well as retrieve core components or fuel assemblies from the fuel elevator 208.

In use, the IVTM 116 is able to remove core assemblies 210 from the reactor core 212, as desired. Likewise, the IVTM 116 is able to reposition, add, or remove core assemblies from the core 212, such as, for example, reactivity control elements, fuel elements (which may include fissile fuel elements and/or fertile fuel elements), control rods, neutron reflectors, neutron absorbers, and others. In some cases, the IVTM 116 has responsibility for exchanging core components between the core 212 and the IVS 206.

The IVTM 116 is configured to be positioned, and therefore couple, with any core component in the core by a combination of rotating the IVTM 116 about a longitudinal axis of the IVTM, extending or retracting the pantograph arm in a radial direction relative to the longitudinal axis of the IVTM, and rotating the rotating plug 202, as will be described hereinbelow.

A control rod drive system 214 may be configured to drive control rods 216 from a position above the core 212 down into the core 212. In some cases, the control rod drive system 214 is coupled to the control rods 216 by one or more electromagnetic linkages. Therefore, in some embodiments, a loss of power event will result in the control rods to drop, by gravity, into the reactor core 212 and reduce reactivity.

Figure 3:
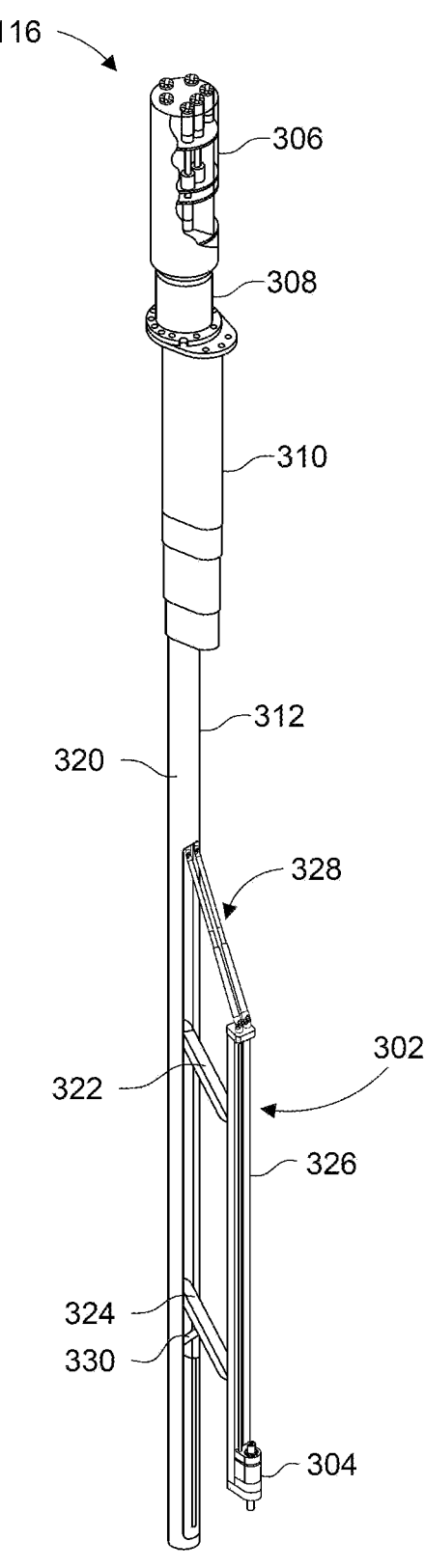
FIG. 3 illustrates an in-vessel fuel transfer machine that may form a component of the in-vessel fuel handling machine, in accordance with some embodiments.

FIG. 3 illustrates an example embodiment of the IVTM 116 showing the pantograph 302 and grapple 304. The IVTM 116 includes an IVTM drive assembly 306, an IVTM bearing housing 308, an IVTM shield plug 310 and an IVTM sub-assembly 312.

The IVTM drive assembly provides linkages for driving at least part of the motion of the IVTM 116. Through one or more motors, gears, splines, or other linkages, the IVTM 116 can be manipulated to be positioned above any core assembly within the nuclear reactor core 212 or IVS 206. As used herein, the terms "core assembly" and "core component" are broad terms, and are used interchangeably to refer to any device that can be inserted or removed from the core, and includes, without limitation, fuel assemblies, control rods, reflectors, neutron absorbers, and the like. In many cases, fuel assemblies and other core components share a similar, or identical, geometric structure so they may be interchanged at locations within the core, such as a socket. The fuel assemblies and other core components may have an identical handling socket that allows the devices to be manipulated by the IVTM 116, and interact with the IVS 206, and/or the fuel elevator 208.

In some cases, the pantograph 302 mechanism allows the IVTM 116 to have a smaller volume envelope than prior in-vessel transfer machines, and thus, the overall reactor vessel 106 can be made smaller than a reactor that utilizes other known IVTM technologies, such as an offset arm configuration. Moreover, typical nuclear reactors will insert the IVTM into the reactor vessel only during power shutdown events, and then remove the IVTM from the reactor vessel before power operations. In contrast, some embodiments disclosed herein are configured to allow the IVTM 116 to remain in the reactor vessel 106 during power operations. Configuring the IVTM 116 in this way provides efficiencies in maintenance, operation, and reduced down time.

Figure 4A:
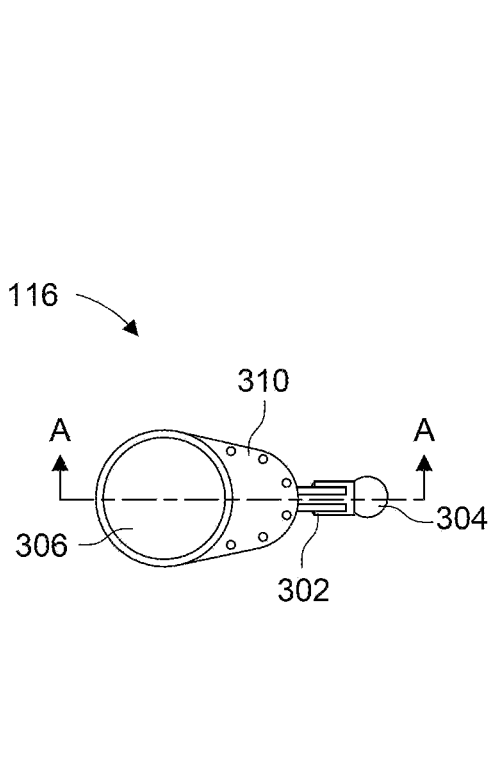
FIG. 4A illustrates a top view of an example in-vessel fuel transfer machine, in accordance with some embodiments.
Figure 4B:
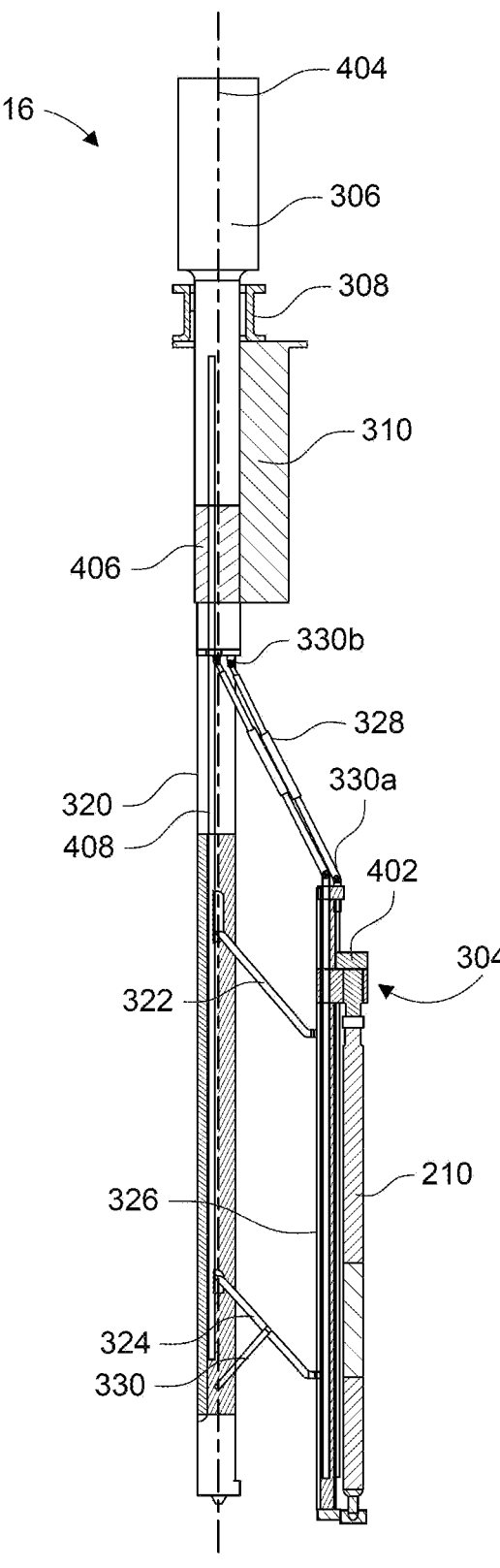
FIG. 4B illustrates a side view of the in-vessel fuel transfer machine of FIG. 4A, in accordance with some embodiments.

With continued reference to FIG. 3 and additional reference to FIGS. 4A and 4B, an example IVTM 116 is illustrated with some of its components and couplings. According to some embodiments, the IVTM 116 incorporates a guide tube 320 along which the pantograph 302 can travel. While the structure is referred to as a guide tube 320, it should not be so limited, and those of skill in the art will readily understand that other structures can provide similar benefits and degrees of freedom for motion of the pantograph 302, such as a rail, a pipe, a channel, or some other suitable structure. The pantograph 302 may be formed of an upper arm 322, a lower arm 324, and a leg 326. The upper arm 322 and lower arm 324 may be pivotally coupled to, and/or, slideably engaged with the guide tube 320. As such, the upper arm 322 and lower arm 324 can pivot to move near parallel or parallel with the guide tube, and also pivot to move away from the guide tube 320. In some cases, the leg 326 is pivotally coupled to the upper arm 322 and lower arm 324 such that pivotal movement of the upper and lower arms 322, 324, results in the leg 326 moved toward or away from the guide tube 320. In some cases, the leg 326 remains parallel with the guide tube. In other words, a longitudinal axis of the leg remains parallel to a longitudinal axis of the guide tube no matter the orientation of the upper and lower arm 322, 324. The leg 326 may nest within a recess or cutaway formed in the guide tube 320. For example, when fully retracted, the leg 326 may be within the guide tube 320. This allows for a compact IVTM and reduces the required penetration size of the IVTM 116 on the RPA 202.

The leg 326 may carry a grapple 304, which may be configured to couple to one or more core components through any suitable coupling mechanism. The grapple 304 may include a grapple head 402 that is slidable along the leg 326. The leg 326 may define a pathway along which the grapple 304 may shuttle. In other words, the grapple may travel along the pathway from a first position to a second position and any location in between the first position and second position.

In some cases, the guide tube 320 is configured as a telescoping tube, such that its overall length can be variable, such as to position the pantograph 302 in a vertical position. For ease of description, the remainder of the disclosure will assume that the guide tube 320 is vertical, and thus, the leg 326 is also vertical throughout motion of the upper and lower arms 322, 324. The guide tube 320 may be extended or retracted in a vertical direction to reposition the pantograph 302 within the reactor vessel. The pantograph 302, in turn, may also be coupled to the guide tube 320 by rollers, such that the pantograph 302 may travel up or down the guide tube 320.

One or more pantograph drivelines 328 may operatively couple the pantograph 302 with the IVTM drive assembly 306 and may transmit motion to the pantograph 302 components. The pantograph drivelines 328 may be coupled via one or more universal joints 330a, 330b that allow the angular relationship between the driveline and the guide tube 320 and leg 326 to be variable. In some embodiments, the grapple 304 may travel up and down the leg 326, such as through any suitable mechanism or combination of mechanism, such as a power screw, rollers, a channel, wheels, belts, and/or chains. Thus, vertical positioning of the grapple 304 may be accomplished through any of a variety of ways, such as manipulating the telescoping length guide tube 320, traveling the pantograph 302 up or down the guide tube 320, by driving the grapple along the leg 326, and by a combination of movements. A link 330 may provide motion input to the upper arm 322 and/or lower arm 324 to extend or retract the leg 326 relative to the guide tube 320. In some embodiments, the pantograph mechanism 302 allows the leg 326 to remain parallel with the guide tube 320 while being manipulated radially toward or away from the guide tube.

The motion of the IVTM 116 and its components may be under control of a control unit and one or more actuators. For instance, the systems and/or methods described herein may be under the control of one or more processors. The one or more processors may have access to computer-readable storage media ("CRSM"), which may be any available physical media accessible by the processor(s) to execute instruction stored on the CRSM. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information, and which can be accessed by the processor(s). In some cases, the memory storing instruction is non-transitory memory and when the instructions are executed, cause the processors to take actions that result in control of the systems described herein.

FIGS. 4A and 4B illustrate the IVTM assembly 116 from a top view, and cross-sectional view, respectively. The drive assembly 306 may typically be cylindrical and house some of the mechanical actuators that control the IVTM, including the pantograph and grapple. In some cases, the drive assembly 306 is centered with respect to the guide tube 320 and a central axis 404 extends through the drive assembly 306 and guide tube 320. A rotating plug penetration shield plug 310 provides a sealing engagement between the IVTM 116 and the RPA 202 (of FIG. 1) where the IVTM extends through the RPA.

A driveline shield plug 406 provides a seal between the driveline of the IVTM 116 where it penetrates through the RPA. In some embodiments, a plug is installed at each penetration through the RPA and the reactor head. A pantograph actuation driveline 408 extends along the guide tube 320, and in some cases, extends through a hollow center of the guide tube 320 and transmits mechanical energy from the drive assembly 306 to the pantograph, such as for extending the pantograph 302 and activating the grapple 304, either for travel stroke or for engaging/releasing a core assembly 210. In some embodiments, the pantograph actuation driveline 408 is selectively engageable with the pantograph 302. The pantograph 302 can therefore either be driven by the pantograph actuation driveline 408 when the pantograph drive line 408 is engaged with the pantograph 302, or the pantograph 302 may be free floating and able to move within a horizontal plane when the pantograph actuation driveline 408 is not engaged. For example, when the pantograph 302 is in a free floating configuration, the pantograph is able to move in response to external forces, as will be described later herein.

FIG. 4B illustrates a core assembly 210 coupled to the grapple 304. In some cases, the act of withdrawing a core assembly imparts frictional forces on adjacent core assemblies that cause liftoff forces on the adjacent core assemblies. In some embodiments, a hold down foot 410 may be provided as part of the pantograph 302 to secure one or more adjacent core assemblies to counteract the frictional lift off forces exerted on the one or more adjacent core assemblies by the withdrawing core assembly as they are manipulated by the IVTM 116.

Figure 5:
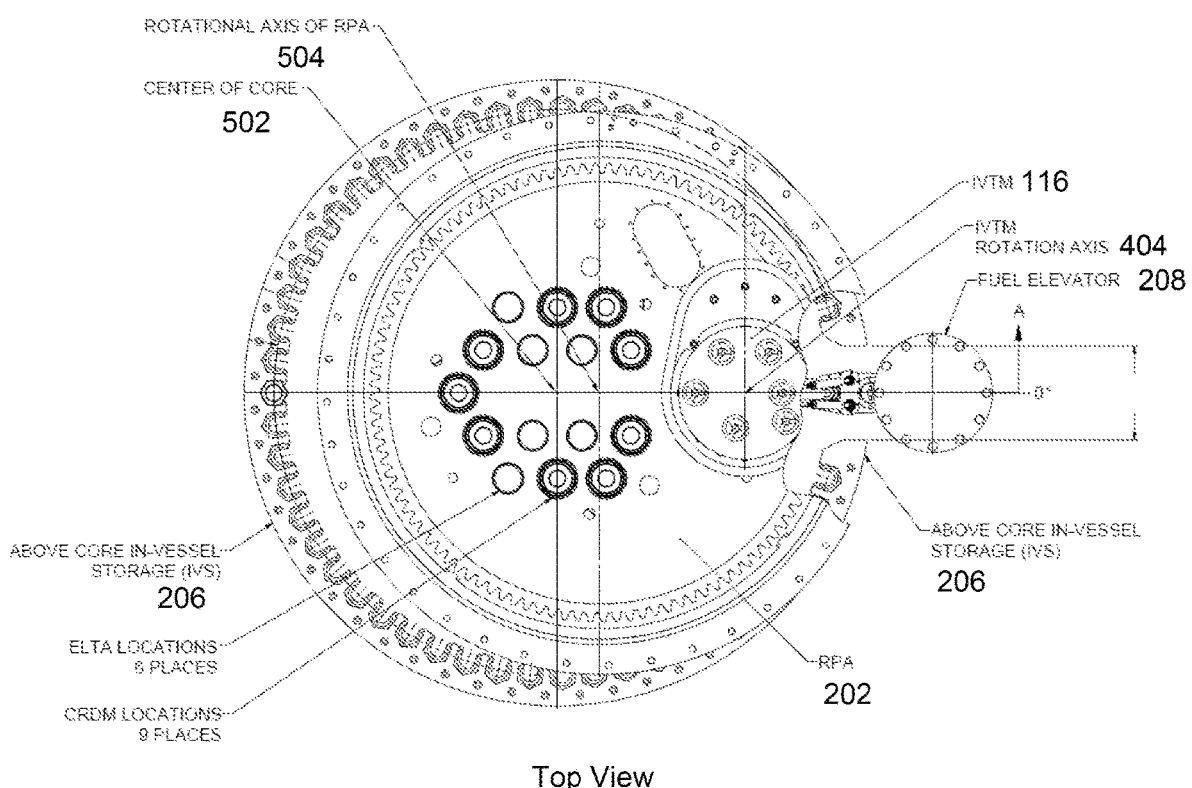
FIG. 5 illustrates a top view of a rotating plug assembly, an in-vessel storage system, a fuel elevator, and an in-vessel fuel transfer machine, in accordance with some embodiments.
Figure 6:
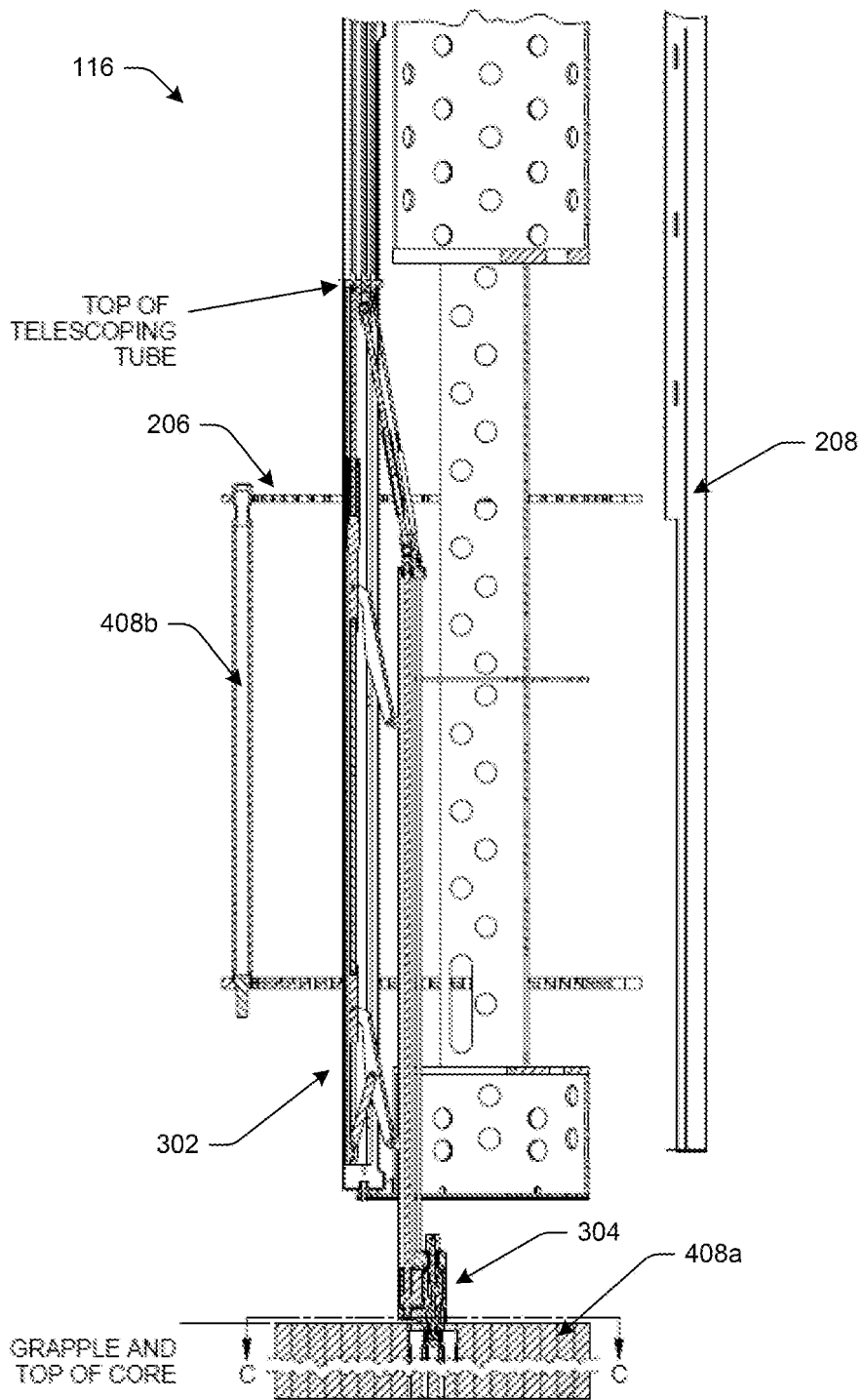
FIG. 6 illustrates a side view of a pantograph and grapple mechanism of an in-vessel fuel transfer machine, in accordance with some embodiments.

FIG. 5 illustrates a top view of the rotating plug assembly 202, IVTM 116, and fuel elevator 208 and their relative positioning, in accordance with some embodiments. In some cases, the nuclear reactor has a center of core 502, which may also coincide with a center of the reactor vessel. While the reactor components may be concentric, it some embodiments, the RPA 202 may not be concentric with the core, and thus, has its own RPA axis 504 about which the RPA revolves. Similarly, the IVTM 116 has its guide tube central axis 404 about which the IVTM 116 revolves. In many cases, the guide tube central axis 404 is not concentric with either the RPA axis 504 or the center of core 502. In some cases, the in-vessel storage 206 is circular and may be concentric with the reactor vessel, as shown in FIG. 6. However, this is not necessary, and the in-vessel storage 206 may be offset, or located in another location or configured as a shape other than generally circular.

The IVTM 116 is configured to be moved to grip a core assembly from any of the sockets in the core, and is further configured to be moved to any position of the in-vessel storage 206 and the fuel elevator 208. By rotating the RPA 202, rotating the IVTM 116, and/or extending the pantograph, the grapple 304 is able to move through arcuate eccentric paths to reach any core assembly positioned within the core, within the IVS 206, or at the fuel elevator 208. These movements may be controlled by a fuel handler controller that is programmed with instructions to reposition core assemblies by engaging linkages to effect such movement. The linkages may include, without limitation, motors, ball screws, drive lines, channels, chains, rollers, or other types of linkages that may be electrically controlled.

FIG. 6 illustrates the IVTM 116 seating/unseating a core assembly 408a from the core. As illustrated, the RPA 202 and the IVTM 116 may be rotated and the pantograph 302 extended such that the grapple 304 may reach any core assembly within the core. Once a core assembly 408a is removed from the core, the IVTM may position the core assembly 408a into the IVS 206 at any available location, such as the location indicated by core assembly 408b. In some cases, the fuel elevator 208 is spaced apart from the IVTM 116 to allow the IVT to freely rotate around 360° without interfering with the fuel elevator 208. The pantograph 302 may be extended to reach the fuel elevator 208, such as for exchanging a core assembly with the fuel elevator 208.

The pantograph 302 may be raised and lowered by extending or retracting the telescoping guide tube 320, and also by manipulating the pantograph 302. The grapple 304 is raised and lowered along with the pantograph 302, and additionally by being able to travel on the leg 326 as described in embodiments herein. In some cases, the grapple 304 is able to extend to the core assemblies within the reactor core, plus have some amount of predetermined overtravel built in. For instance, the grapple 304 may be configured with a travel stroke that allows it to extend a predetermined distance beyond the top of the core assemblies when positioned in the core.

In some embodiments, the grapple 304 is operatively coupled to one or more sensors. The one or more sensors may include a position sensor, a force sensor, an acceleration sensor, a visual sensor, or some other type of sensor. According to some embodiments, a force sensor is configured to generate a force signal associated with the grapple contacting a core assembly. The force signal may be a compressive force as the grapple extends vertically to engage the core assembly, and may additionally be a side load and/or torque force imparted on the grapple 304. A force sensor may be any suitable transducer that converts an input mechanical load, such as weight, tension, compression, or pressure into an electrical output signal. Under control of one or more processors, a fuel handling controller may receive the signal and determine a location, a load, or a force imparted on the grapple 304. This force may be used to engage the grapple with the core assembly, or move the grapple accordingly to reduce the load on the grapple, as will be discussed in further detail.

Figures 7A, 7B, 7C:
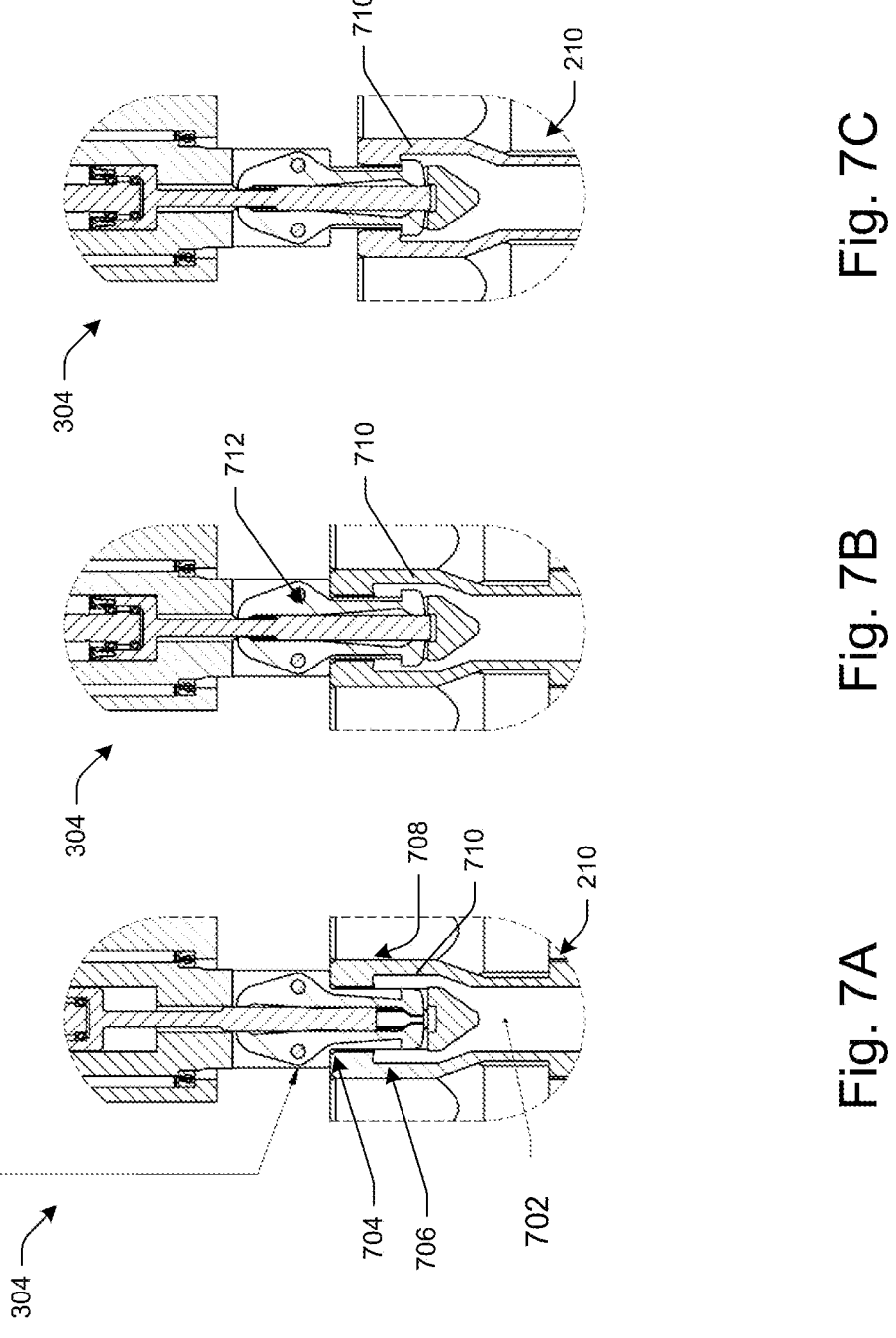
FIG. 7A illustrates a grapple head with its fingers retracted, in accordance with some embodiments.
FIG. 7B illustrates a grapple head with its fingers extended within a handling socket of a core assembly, in accordance with some embodiments.
FIG. 7C illustrates a grapple head with its fingers engaged within a handling socket of a core assembly, in accordance with some embodiments.

With reference to FIGS. 7A, 7B, and 7C, a grapple 304 is shown engaging with a core assembly. In some examples, a core assembly 210 may have a handling socket 702 that includes a first bore 704 having a first diameter that broadens to a second bore 706 having a second diameter and a shoulder 708. The grapple 304 may have one or more fingers 710 that are configured to selectively extend outwardly that interfere with the shoulder 708 to prevent unintended removal of the grapple from within the handling socket 702 of the core assembly 210. FIG. 7A illustrates the fingers 710 retracted as the grapple 304 is inserted into the handling socket 702. According to some embodiments, a cam shaft 712 may be extended through the grapple 304 to extend the fingers 710 outwardly into the second bore 706, such as illustrated in FIG. 7B. As shown in FIG. 7C, once the cam shaft 712 manipulates and extends the fingers 710 outwardly, as the grapple moves upward and away from the core assembly 210, the fingers 710 interfere with the shoulder 708, thus inhibiting withdrawal of the grapple 304 from the core assembly 210.

While FIGS. 7A, 7B, and 7C illustrate example embodiments of a grapple engaging with a core assembly, it should be appreciated that there are numerous structures that could be implemented to provide the same functionality. For instance, the grapple may include fingers that retract to grasp the core assembly from outside the core assembly. The fingers may be biased in a retracted or extended position, and the cam shaft may force the fingers into an unbiased position in order to grasp the core assembly. As such, the illustrated embodiment is given as an example and should not be construed as limiting.

Figure 8:
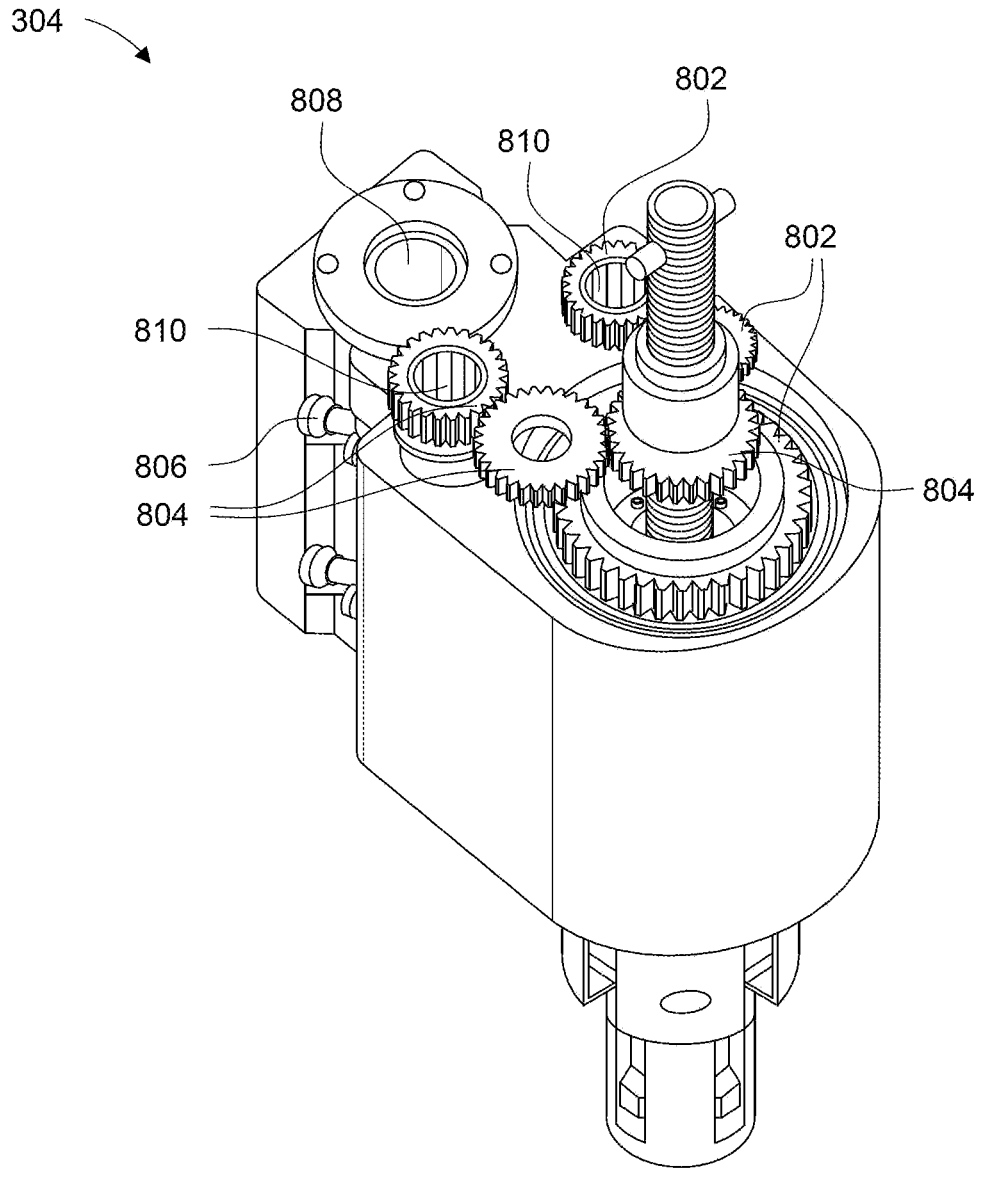
FIG. 8 illustrates a grapple assembly, in accordance with some embodiments.

FIG. 8 illustrates an example grapple assembly 304 for an IVTM 116 according to some embodiments showing a representative gear train. As described herein, the IVTM is configured to numerous motions and degrees of freedom. To accomplish the motion to allow the grapple 304 to reach the core socket locations, one or more linkages are provided, that may result in translation, rotation, and a combination of movements. The linkages may be provided as gear trains, and may include one or more gears, splines, rollers, nuts, power screws, lead screws, or other components. In some cases, the linkages convert rotation motion to linear motion, and vice versa. According to some embodiments, the grapple is configured for rotation by a grapple rotation gear train 802. The grapple rotation gear train 802 may receive a motor input and through the gear train 802, the input torque from the motor input may be increased such as by reduction gears in the grapple rotation gear train 802. Similarly, the grapple fingers may be manipulated by a grapple finger actuation gear train 804. In some cases, the grapple finger actuation gear train 804 and associated power transmitting components converts a rotational input into linear motion, such as to linearly drive the cam shaft 712 as described with any of the embodiments described herein. Other power transmitting components may include one or more sliding splines 810 and/or ball nuts 808.

One or more alignment rollers 806 may provide alignment between the various components. One or more ball nuts 808 may be provided to provide smooth operation of the nut along a threaded shaft and convert rotational motion into linear motion. One or more sliding splines 810 may additionally be provided to provide kinetic input to manipulate the grapple. According to some embodiments, the gear train and power transmitting components are formed to withstand the continuous environment of a nuclear reactor during power operations. In other words, in some embodiments, the IVTM, and specifically, the pantograph and grapple are configured to be permanently installed within the nuclear reactor, although it may be removed for maintenance, but is configured to remain in place during power operations. In these cases, the IVTM components are qualified at elevated temperatures to sustain neutronic activity and remain at least partially submerged in the primary sodium coolant in those embodiments utilizing a sodium pool-type reactor. The components are formed of materials and/or have coatings configured to maintain reliability during power operations for extended periods of time, such as up to 18 months, 36 months, 60 months, 120 months, or more.

In some embodiments, the drive assembly 306 for the IVTM is located on a first side of the reactor head 102 while the pantograph 302 and grapple 304 are located on a second, opposing, side of the reactor head. For example, a ballscrew that may control the telescoping tube actuation and/or the IVTM hold down foot may be positioned above the reactor head, and therefore, may not be submerged in the primary coolant sodium pool. Similarly, a second ballscrew that may control the pantograph horizontal motion may likewise be located above the reactor vessel head while the pantograph is located below the reactor vessel head and is submerged in the primary coolant sodium pool. According to some embodiments, locating at least some of the IVTM driveline components above the reactor head positions them in the head access area rather than submerged in the primary coolant sodium pool. This may improve reliability of the IVTM and reduce possible failure modes and improves recovery actions. Furthermore, positioning the ballscrews above the reactor head rather than below the reactor head results in a straight pull or "rising stem" type actuator and a linear motion shaft seal, as opposed to a rotating shaft seal at the penetration of the shaft through the rotating plug assembly. The actuators for the guide tube, pantograph, and grapple may be any suitable structure and include straight-pull actuators, rotary actuators, ball screw actuators, sliding actuators, linear shaft and ball nut actuator. In some cases, the actuators for the guide tube, pantograph, and/or grapple may be located above the vessel head in the head access area, repair to these components may be routine that does not require removal of the entire IVTM or breaking of the primary pressure boundary. In some cases, the IVTM extends through the rotating plug 202 and seals with the rotating plug 202 with a sliding shaft seal. In some embodiments, the IVTM 116 is affixed to the rotating plug 202 through bolts, welding, flanges, seals, or other suitable structure.

According to some embodiments, the IVTM 116 is configured to always remain inside the reactor vessel, even during power operations. As such, the IVTM 116 may be formed of materials that are able to withstand the nuclear reactor core environment, such as the sodium coolant, the cover gas, the operating temperatures, and the neutronic activity.

Figure 9:
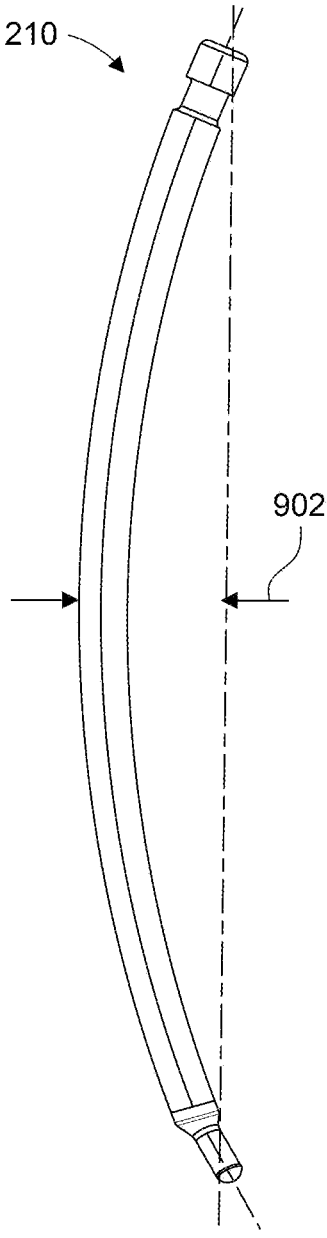
FIG. 9 illustrates a deformed core assembly having a first order deformation, in accordance with some embodiments.
Figure 10:
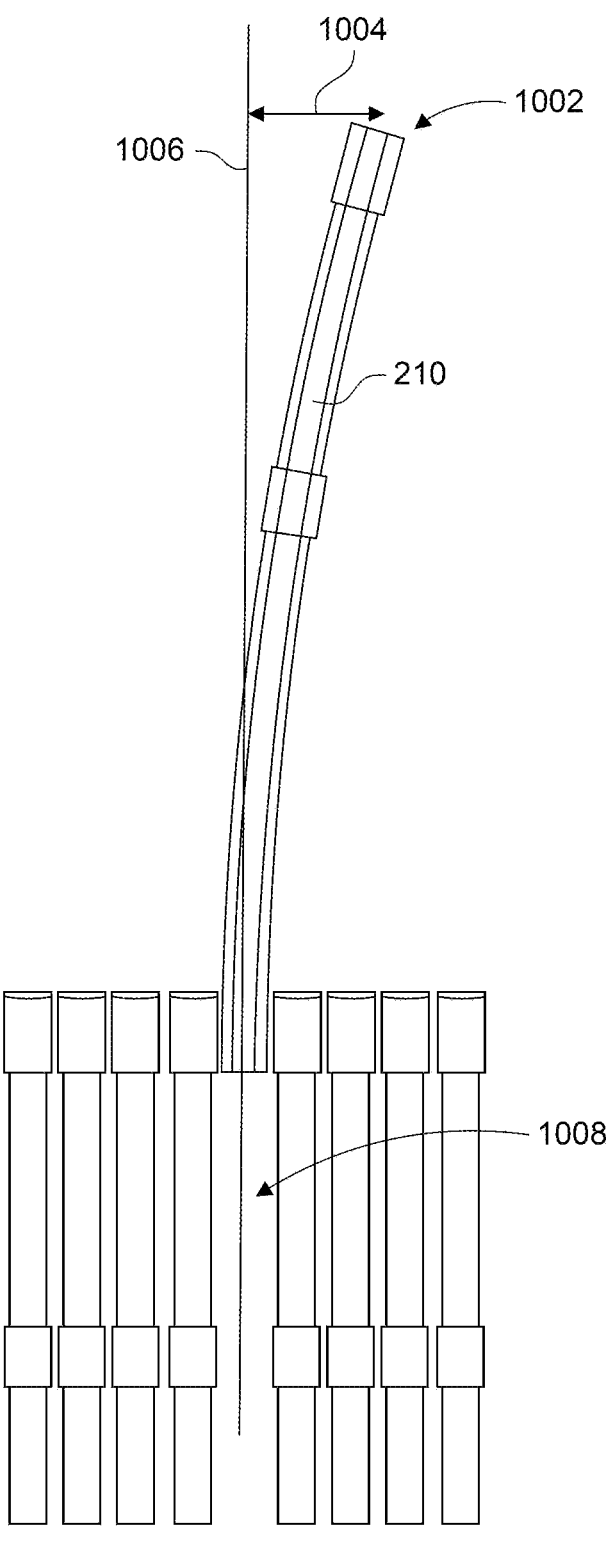
FIG. 10 illustrates a deformed core assembly being removed from a core socket, in accordance with some embodiments.

FIGS. 9 and 10 illustrate a core assembly 210 that has been deformed. In some cases, the core assemblies become deformed through thermomechanical stresses and parameter-related change mechanisms. The core assemblies may experience deformation in the first bending mode, resulting in bowing, as illustrated in FIG. 10. In some cases, the core components may also experience bending in the higher bending modes. While core assembly deformation may be attenuated through increasing the core assembly stiffness and resistance to creep and swelling, bowing must still be accounted for.

The deformed core assembly 210 may have a bow value 902 related to the bending stress in the core assembly 210. The bow value 902 may be related to a load imparted to the grapple 304 during insertion or withdrawal of the core assembly 210. As the core assembly 210 is inserted or withdrawn, the upper end 1002 may experience an offset 1004 from the core component location within the core. The offset 1004 may be determined between the location of the upper end 1002 of the core assembly and a straight line 1006 into the socket location 1008 in the core.

Figure 11:
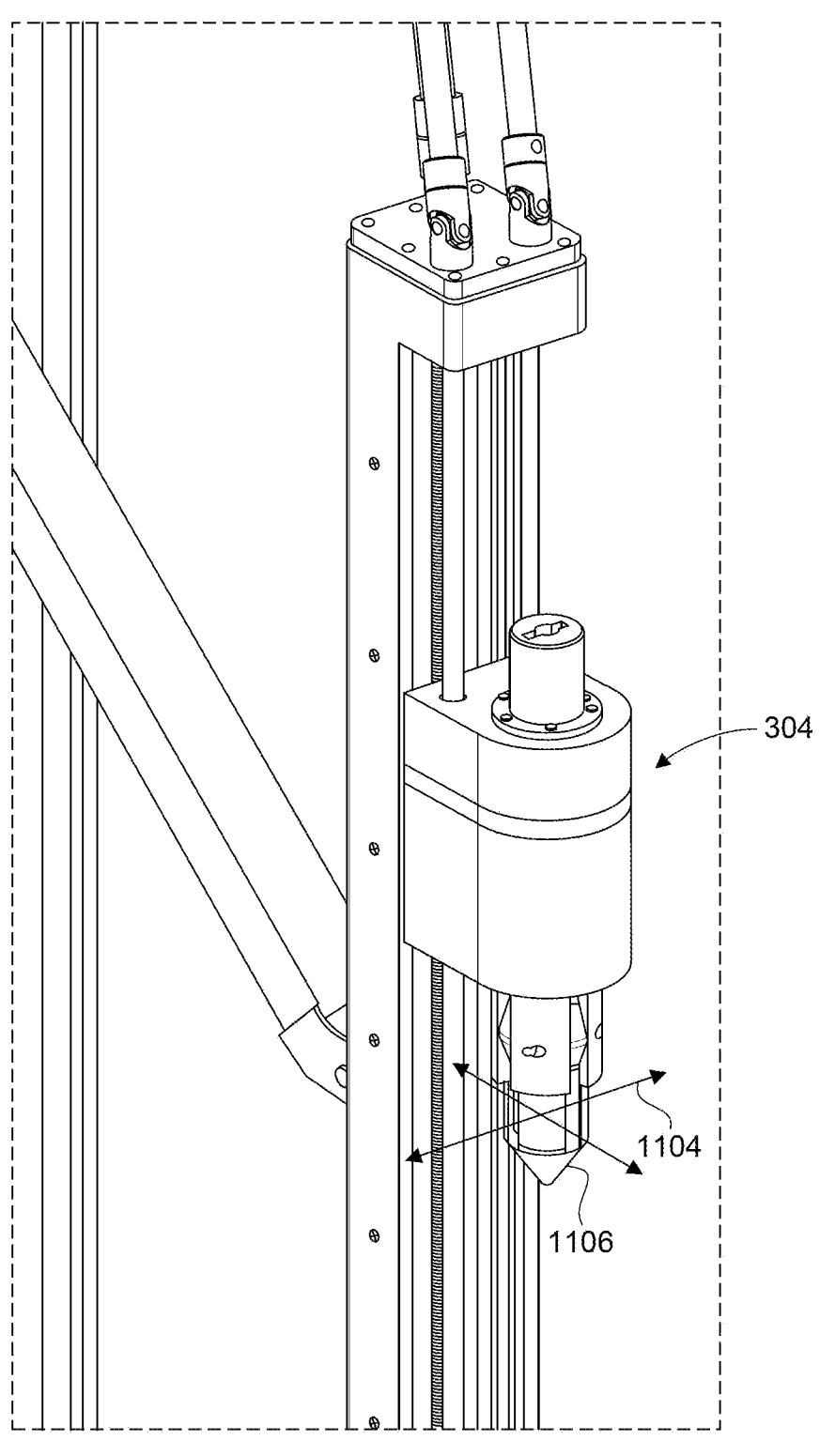
FIG. 11 illustrates a floating or compliant grapple that is configured to move in a horizontal plane, in accordance with some embodiments.

With additional reference to FIG. 11, in some embodiments, the grapple 304 is configured to handle core components 210 that have experienced first order, second order, and/or third order bending modes (e.g., C-shaped, S-shaped, or W-shaped). As described above, the grapple 304 may be in communication with one or more sensors 1102. The sensors 1102 may be load sensors that are configured to detect loads on the grapple 304, which may be torque, side loads, compression loads, tension loads, and others. In some examples, the grapple 304 may be a floating grapple 304 such that it can move laterally (e.g., in a horizontal plane) to reduce the loads imparted on the grapple 304 by the core assembly 210. The grapple 304 may thus move in directions indicated by arrows 1104 to account for the deformation of individual core assemblies 210. In some embodiments, the sensors may send a signal to a grapple controller that determines the direction and magnitude of the load and then initiates movement of the grapple 304 to reduce or eliminate the load on the grapple 304. In some cases, the grapple is under control of a fuel handling supervisory control system that may be configured to monitor and control the sub-systems and sub-components of the fuel handling systems. The fuel handling supervisory control system may be in communication with a plant monitoring and control system that is configured to communicate, through one or more sub-control systems, with all the systems within the reactor. The grapple 304 may be moved by actuating one or more of the pantograph arms, grapple rotation, IVTM rotation, or rotating plug rotation. In this way, the grapple 304 can move to reduce additional stresses imparted on the core assembly 210 during insertion or withdrawal, which also reduces stresses on surrounding core assemblies and reduces contact between adjacent core assemblies.

According to some embodiments, the grapple 304 may additionally or alternatively be compliant such that the nose 1106 of the grapple 304 can pivot to align with the handling socket of the core assembly 210. In some cases, the nose 1106 may include a spherical bearing, such as a ball and socket coupling, to allow the nose to pivot about the coupling. Of course, any suitable type of coupling may be used to provide some compliance and freedom of motion for the nose. In some cases, the grapple 304 has angular compliance, which in some cases may be on the order of 0.24°, or 0.37°. or 0.5°, or 0.625°, or 0.75°, or 10, or more. In some cases, providing an angular offset of the grapple 304 allows the extraction load to be more evenly distributed across the grapple fingers.

In some cases, the grapple 304 is configured so that when it is withdrawing or inserting a distorted core component, the grapple 304 can "float" laterally to follow the distorted core component into or out of the core. This may be accomplished by utilizing the drive mechanisms and electronics of the IVTM to measure driveline torque and then react to the torque by moving the grapple and essentially following the shape of the core assembly to limit forces on the core component as well as the IVTM. In some cases, this may also be provided by disengaging the pantograph drivelines to allow the pantograph, and thus the grapple, to freely move in a horizontal plane in response to externally applied loads by the distorted core component.

In addition, allowing the IVTM drivelines to float the grapple provides benefits during core component handling socket insertion which provides a more direct line insertion into the core component socket.

With reference to FIG. 12, a process 1200 is shown for withdrawing a deformed core assembly. At block 1202, the IVTM is positioned over the desired core assembly and may include floating the IVTM drivelines to provide compliance and freedom of movement in response to external forces or loads. At block 1204, the grapple is lowered to a predetermined distance above the core assembly handling socket, or a distance at which the grapple nose is beginning to insert into the handling socket. Additionally, pre-set limits for side or axial load could be established and the grapple may be lowered until either full insertion is achieved, or these loads are determined, at which point, the process may proceed. At block 1206, the brakes for the pantograph arm may be engaged and the IVTM rotation drive motor may be disengaged, thus allowing the IVTM to freely rotate in response to any side loads on the grapple 304. At block 1208, the grapple may be driven into the handling socket until it reaches either the predetermined load, or a position encoder position. During this insertion process, the pantograph arm extends and/or the IVTM rotation drive encoders may be monitored for deviations from their positions when the brakes were disengaged. If the encoders determine a load value or position value above a threshold value, (which may indicate movement outside of expected parameters or outside a movement envelope), the brakes may be re-engaged, and the motion stopped. Recovery motions could then proceed to evaluate and rectify the situation.

At block 1210, the grapple fingers can be extended, and the core component withdrawal process can proceed. The grapple fingers may be extended through any suitable mechanism, such as by inserting a cam shaft through a cam to extend the fingers.

At block 1212, the IVTM drivelines may remain in the float state until the core assembly is withdrawn a distance to adequately remove the core assembly from the core socket. The predetermined distance may be correlated with a lower load pad of the removed core assembly clears the upper load pads of the adjacent core assemblies.

At block 1214, once the core assembly is withdrawn to the pre-determined level, which may coincide with a portion of the withdrawal strike, such as 75%, 80%, 85%, 90%, 95% or more of the withdrawal stroke, the drive brakes may be re-engaged, and the withdrawal process may proceed without any further grapple compliance.

A core assembly insertion process may follow a very similar, but reversed, process to account for deformation of the core assembly. In some cases, the horizontal compliance may be accomplished with rack and pinion plates, floating the IVTM drive motors (e.g., disengaging the drive motors), or some other compliant structure.

Figure 13:
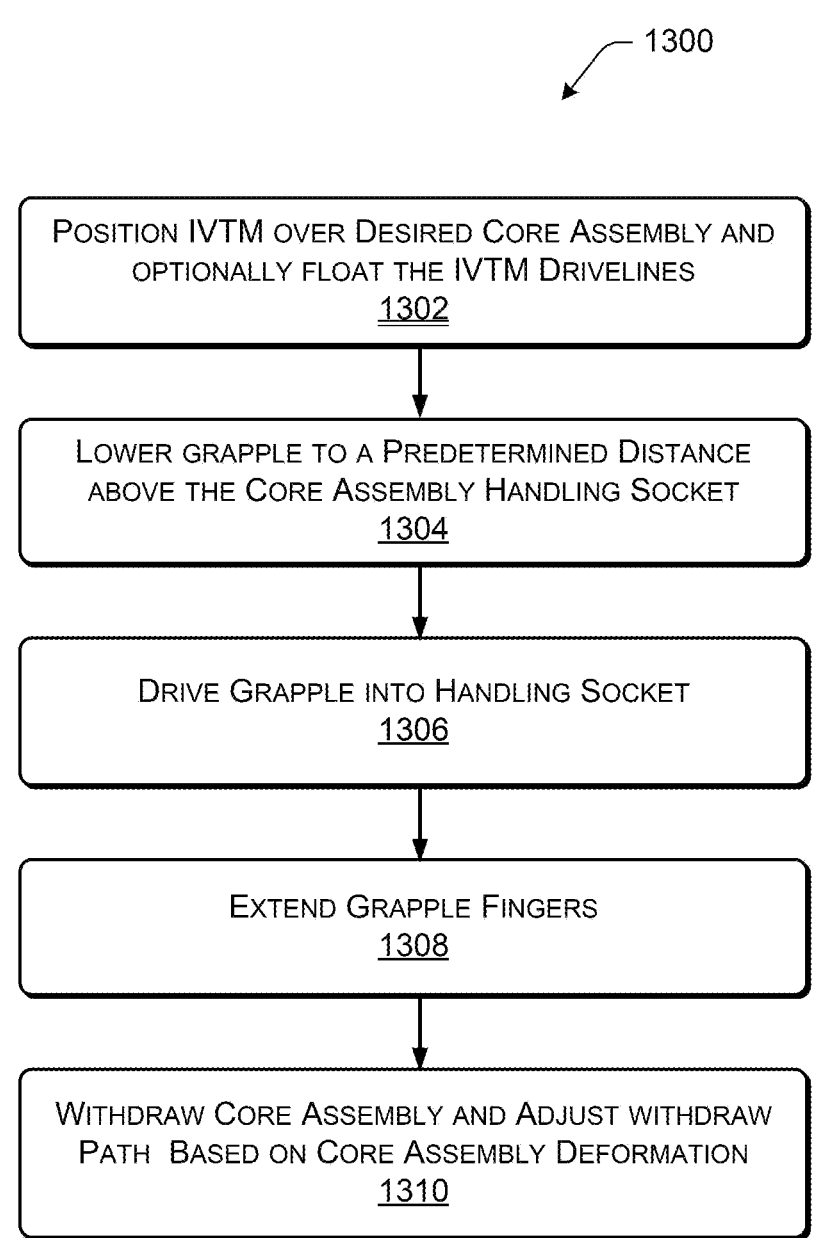
FIG. 13 illustrates a process flow diagram for withdrawing a deformed core assembly, in accordance with some embodiments.

FIG. 13 illustrates another process 1300 for withdrawing a deformed core assembly according to some embodiments. At block 1302, the IVTM is positioned over a desired core assembly.

At block 1304, the grapple is lowered to a predetermined distance above the core assembly handling socket. In some examples, the grapple nose is allowed to pivot to align itself with the core assembly handling socket as described herein, such as, for example, by a spherical joint that allows the grapple nose to pivot up to about 1° or more.

At block 1306, the grapple is driven into the handling socket. During this step, the grapple nose may be free to pivot to align itself with the handling socket. Positioning of the grapple nose with the core assembly handling socket may be performed through position sensors and the motion may be controlled by the IVTM controller, which may include rotating the rotating plug, rotating the IVTM, causing the grapple to travel on the leg, and/or extending the pantograph arms. In some cases, one or more sensors sense compression and side loads on the grapple. In some cases, the IVTM drivelines are engaged and the grapple is moved to reduce the side loads on the grapple. For example, where a core assembly may be deformed such that its upper end is not in its expected position, as the grapple nose attempts to enter the core assembly handling socket, a sensor may sense a side load being applied to the grapple based on the out of position core assembly handling socket. A sensor may send a signal associated with the displacement of the core assembly handling socket, and the IVTM drivelines may reposition the grapple nose to better align with the core assembly handling socket, and thus reduce the sideload sensed on the grapple nose.

At block 1308, the grapple fingers are extended. In some cases, the grapple may have 2, 3, 4, 5, or more grapple fingers that can be extended to engage with a portion of the core assembly handling socket. In some examples, the grapple is configured with three fingers for entry into and engaging with the core assembly handling socket.

At block 1310, the core assembly is withdrawn from the socket location in the core and the grapple withdraw path is adjusted based on the core assembly deformation. One or more sensors may monitor the loads applied to the grapple. Where the grapple becomes subject to a side load, such as from a bowed core assembly, the IVTM drivelines may reposition the grapple to accommodate the deformed core assembly and reduce the loads applied to the grapple. This, in turn, reduces any loads a deformed core assembly applied to adjacent core assemblies during its withdrawal. In some cases, the grapple may be moved in a circuitous or arcuate path while withdrawing a deformed core assembly and is not limited to a straight line withdrawal path.

According to some embodiments, each core component is identified, which may be by a unique identifier allowing the IVTM to differentiate between each core component. As used herein, core component identification (CCID) is the process of validating the identify and function of a component by the in-vessel transfer machine. It may be used to provide an additional safeguard and backup to computer tracking of core components and can prevent costly delays and damage due to the mishandling of core components.

Figure 14B:
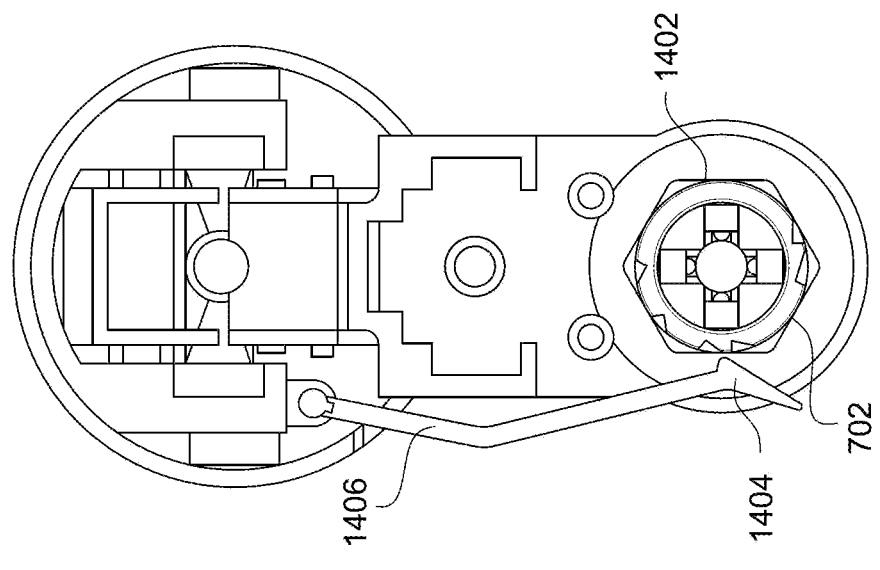
FIG. 14B illustrates a top sectional view showing surface features formed into a core component and a pawl engaging the surface features to determine a unique identification of the core component, in accordance with some embodiments.
Figure 14A:
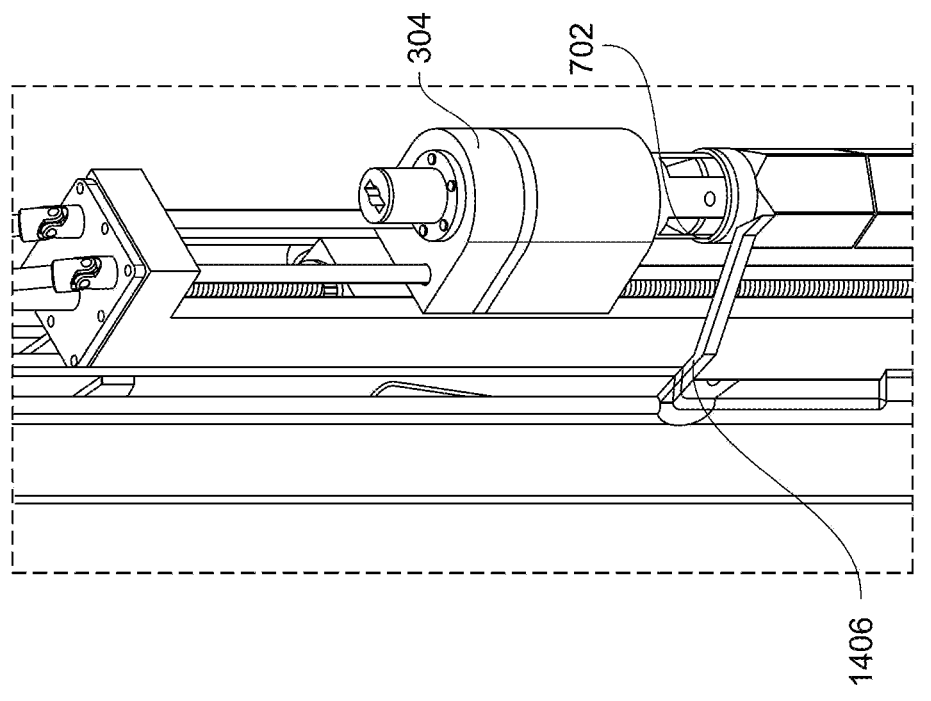
FIG. 14A illustrates a core component identification system including a pawl mounted to a guide tube, in accordance with some embodiments.

With reference to FIGS. 14A and 14B, in some examples, each of the core components is formed with a series of one or more notches 1402 around the circumference of the core component, such as notches about the handling socket, and a mechanical pawl 1404 may be biased to rise and fall into the notches as the core component is rotated. The described pawl and notch system is a mechanical system that may be configured to work as a CCID in numerous types of reactors, including those that utilize a pool of metallic coolant, where optical sensors may be less effective.

In a mechanical CCID system, the motion of a machine element (e.g., pawl 1404) can be translated to a sensor, which may be mounted above the reactor vessel. The motion of the machine element 1404 may be produced by a braille-like pattern on the core component handling socket, which may be used to represent the serial number of the component. The pattern that is read by the machine element 1404 is a feature on the surface which may be a series of bumps, grooves, indentations, lands, protrusions, notches, or other physical characteristic than may cause movement of the machine element 1404. In some cases, the machine element is a pawl 1404 that is biased against the core component, and a feature on the surface of the handling socket 702 may cause motion of the pawl 1404 as the core component is rotated. For instance, where the pawl 1404 is biased against the core component, the core component may be rotated about its axis and the pawl will be caused to move toward or away from the center of the core component. These motions of the pawl 1404 may be determined by a sensor and used to identify information about the specific core component being handled by the grapple 304.

A combination of notches, which may be configured to include a depth, a length, a sidewall draft angle, or other physical attribute which may be meaningful to the path of the pawl 1404, can be used to provide unique identification of the core component, as well as the type of core component, and angular orientation of the core component. In some cases, a single notch may provide angular indexing information that corresponds with a rotation angle of the core component.

In use, once the grapple 304 retrieves a core component, the grapple 304 may position the core component such that the mechanical identification markings are adjacent the pawl 1404. The grapple may then rotate the core component 210 about its longitudinal axis about 180 degrees, or 270 degrees, or 360 degrees, or 540 degrees or more. During the rotation, the identification markings will cause the pawl 1404 to move and send a signal indicative of the pawl movement to a control computer, which may be configured to interpret the pawl movement into data associated with the core component. Thus, a time versus notch detection data acquisition will be generated from the state changes of the CCID control shaft sensors. In some examples, the identification code may be manufactured into each core component using any suitable number and locations of notches. In some examples, 18 or more locations around the circumference of the core component handling socket may be used as a notch location. These locations may be regularly spaced, such as at about 20 degrees apart. As an example, with 18 evenly spaced notches (or information bits), and assuming that the orientation bit consumes 2 bits spacing and that the ID notches are the same size and length, the ID code can thus be 16 bits, or be one of 65,535 or more unique identification codes. Of course, more or fewer informational surface features may be used to provide information relative to the core component. As described elsewhere, the surface features may be notches, and may also be, in addition or in the alternative, bumps, protrusions, grooves, bosses, valleys, lands, dimples, pockets, ridges, or any other surface feature that may be used as informational data associated with the core component.

A database may include data associated with one or more of the core components and the movement of the pawl may be matched with entries in the database to determine an identification of the core component, and other data, include without limitations, type of core component, a time in service, a remaining service life, previous locations within the core, deformation information, burnup, elongation, temperature, and the like. The core component data may be updated to the database with each manipulation of the core component by the grapple.

According to some embodiments, the pawl 1404 includes a pawl arm 1406 that may be pivotally mounted in any suitable location, such as on the guide tube 320. The pawl arm 1406 may be mounted perpendicular to the guide tube to interface with the core component handling socket once it is grappled, raised along the grapple stroke, which may be the top of the grapple stroke. In some cases, the pantograph is fully retracted and the grapple is moved to the top of the grapple stroke in order to position the pawl in contact with the core component. In some cases, the pawl arm may be rotated out of the way to allow the pantograph leg to extend and retract.

According to some embodiments, in use, the pawl arm 1406 may initially be rotated out of the way and the pantograph 302 may be extended to the target core component, the grapple 304 may engage the target core component, and the grapple 304 withdraws the core component from the core. The telescoping guide tube 320 may be driven to raise the pantograph 302 up so that it can retract into the main guide tube 320. The pantograph 302 may fully retract thus brining the core component inward toward the pawl 1404. The pawl arm 1406 may then be driven and rotated into position to engage the pawl 1404 with the handling socket of the core component.

The grapple head drive may rotate the core component and the pawl 1404 reads the notches on the handling socket. The pawl 1404 is raised along the outer diameter of the handling socket and when a special alignment notch is encountered, the pawl arm rotated inward as it falls into the notch, and this angular movement of the pawl 1404 is sensed by an encoder. Similarly, the pawl 1404 experiences further movement as it encounters additional surface features that may indicate the serial number of the core component. The pawl arm 1406 may then be rotated out of the way and the handling process may proceed.

Figure 15B:
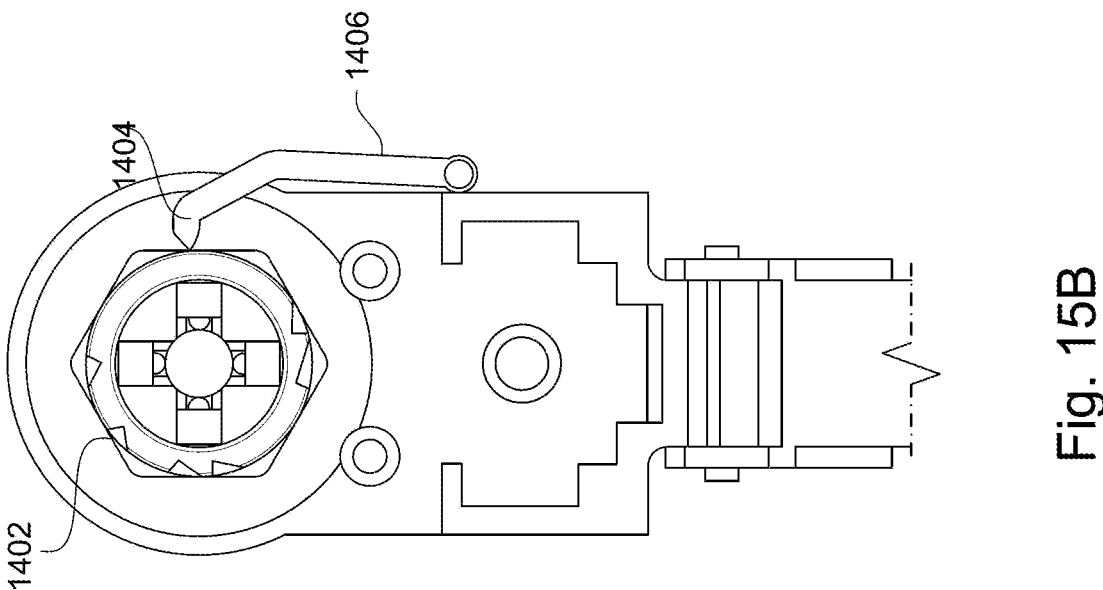
FIG. 15B illustrates a top sectional view showing surface features formed into a core component and a pawl engaging the surface features to determine a unique identifier of the core component, in accordance with some embodiments.
Figure 15A:
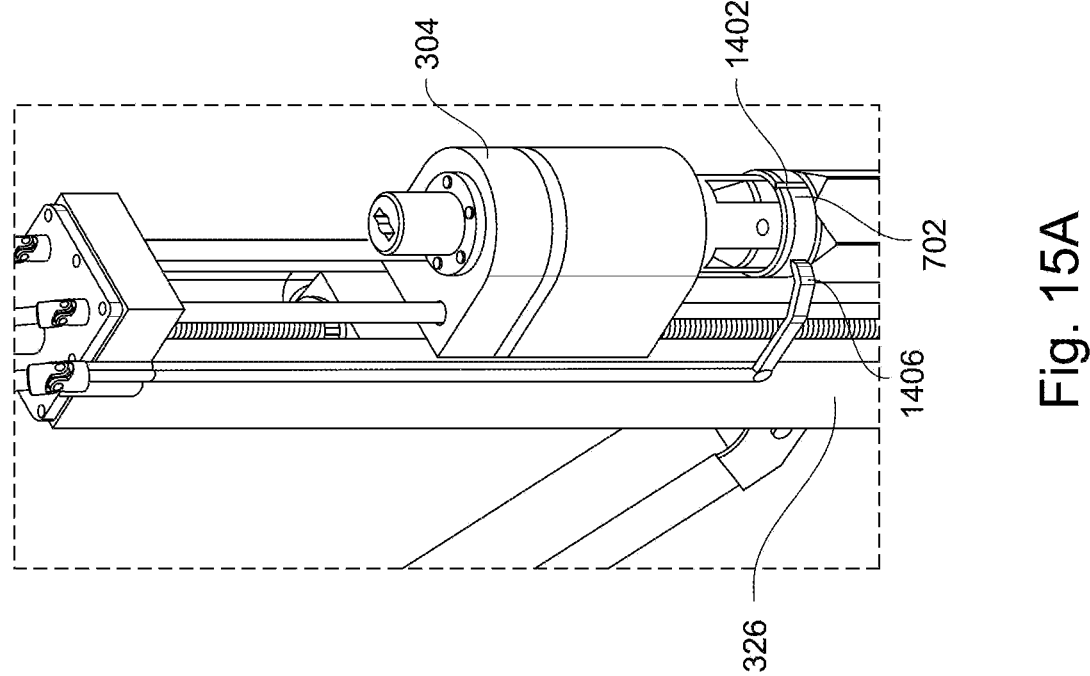
FIG. 15A illustrates a core component identification system including a pawl mounted to a pantograph, in accordance with some embodiments.

In some examples, the pawl arm 1406 may be position at other locations, such as on the grapple itself, which may alleviate the need to full traverse the grapple or retract the pantograph in order to perform core component identification. For example, the pawl arm 1404 may be mounted to the side or the top of the grapple. A drive line may be configured to pivot the pawl arm downwardly until the pawl 1404 contacts the core component and identification is carried out as described elsewhere herein. Similarly, the pawl arm 1406 may be located on the pantograph leg, thus allowing identification with the pantograph in any state of extension or retraction. This embodiment is shown in FIGS. 15A and 15B where the pawl arm 1406 is located on the pantograph leg 326

Some embodiments may incorporate an ultrasonic identification system in which ultrasonic waves are emitted at an etched or embossed serial number on the core component and captured by a receiver, which may feed the raw data to a computer algorithm which interprets the serial number. An ultrasonic CCID may be implemented in combination with, or in the alternative to, a mechanical CCID system. In some cases, a mechanical CCID may provide the functionality of core component identification, and an ultrasonic system may be used for various inspection techniques, such as in-service inspections. The in-service inspections may be used to inspect safety related structures, identify or locate obstacles that could cause collisions for fuel handling equipment, and detect other defects. Of course, an ultrasonic system may function as a backup CCID to a mechanical CCID in case the mechanical CCID suffers defects of its own.

The systems and components described herein may be under control of one or more computer systems configured with instructions to receive data, interpret data, send control instructions and provide feedback.

In some cases, the sub-components of the fuel handling systems are semi-autonomous machines capable of performing their specific functions, that do not require interfaces with other systems, either locally automatically, or locally manually. In those cases the fuel handling supervisory control system (FHC) may gather information about the status of the conditions and states on those machines for presentation to the fuel handling operators for monitoring. In addition, each of these sub-components may be provided with the means to direct the control of the operations of the machine.

In some cases, the sub-components of the fuel handling systems are monitored and controlled directly from the FHC system. In those cases, the FHC may provide the Input/Output (I/O) hardware and software needed to directly receive the parameters needed for monitoring, and direct the controlling, of the sub-components functions The FHC may also be responsible for collecting and delivering all information between systems, subsystems and components (SSCs) that support the FH SSCs operations. Some representative examples include interface parameters, neutron monitoring, argon gas and radwaste systems that support the FH SSCs functions, and the physical position, and component status, of autonomous FH machines as they interface with other FH machines.

According to some embodiments, a data acquisition and control (DAC) system allows the fuel handling system to communicate with the FHC system which may be bidirectional communication, such as to send status and position data and receive command instructions. In some embodiments, the equipment will be able to support several types of inputs and outputs, including analog inputs; bi-stable inputs; analog outputs; and bi-stable outputs among others. Analog inputs are electronic signals generated directly from sensors and transmitters installed in plant equipment. In some cases, these signals may include Thermocouples (T/C) and Resistance Thermal Detectors (RTDs)—Temperature elements installed in plant equipment with cold junction and lead length compensation applied. Linear voltage signals may be provided as process transmitters that may be installed in, or tubed to, plant equipment. The transmitter may be operated to cover the process parameter to a measurable linear signal representative of a 0-100% calibrated range of the process.

Any of the inputs and outputs described herein may be used to affect control and/or operation of the fuel handling system, and the pantograph and grapple as described herein.

As described above, a database may be used to store historical data associated with the fuel handling system and each core component that enters or exits the reactor. For example, a fuel handling machine operating zone configuration database may store information associated with the volume envelope that the fuel handling system may be moved through without striking fixed building equipment, other moveable fuel handling equipment, and within approved load paths. In some examples, the FHC may maintain a configuration database that will identify the positions of all static equipment and load paths with an X, Y and Z axis position configuration for use in controlling the FH machine movements. Because the static operating zones can change with the plant life, the FHC may maintain this information in a configurable database that can be modified over time. The moveable machine interferences may also have their dimensions established in this database, and can be monitored by the FHC for current position to update the dynamic operating map of moveable machines that may interact within the same plane and pathways.

Furthermore, a core component inventory and tracking database may include data associated with individual core components. In some cases, the FH machines may be responsible for handling all core components from the time that they are brought into a Core Component Conditioning System until they are stored in the Interim Storage facility. Nuclear operating plants may be responsible for maintaining the inventory of all radioactive material from receipt until it is sent off-site. In addition, the reactor core configuration may be maintained as designed for each fuel cycle. In light water reactors this process is easily maintained visually, and therefore can be manually tracked through the plants life. However, a sodium cooled fast reactor does not allow for visible identification and location verification in all of the fuel handling machines, or the vessel. As such, the FHC may be configured to produce information needed to support the regulatory requirements. Therefore, according to some embodiments, the FHC may maintain a Core Component Inventory and Tracking database that may be both manually, and/or automatically updated, through any suitable human machine interface and machine handled core component moves.

The database may include a configuration data set that may identify each core component of the reactor, including it's type, it's unique core component identifying code, and any other information about the component that would need to be maintained for the purpose of supporting the required inventory records. This information may be initially manually loaded by the plant operators. If some of the information needed for inventory control requires dynamic updating, such as fuel monitoring parameters to identify isotopic concentrations, this can be dynamically updated through interfacing with the other plant monitoring processors connected with the FHC, and then verified by operations for official record keeping.

The database may also be used to maintain the current location in the plant in all of the fuel handling machine sub-systems, it's temporary association with Core Component Transfer Adapters and its moves and location during the life of the plant.

The database may also be a repository for the planned core component move sequences. When it is time to perform the moves, the sequences can be retrieved and utilized by a combination of the operators and automatic move sequences performed by them machines, and verified by operators, or for manual direction of the moves by operators, depending on how the process for fuel moves develops.

In some embodiments, the database may contain one or more of in-vessel transfer machine (IVTM) Operations supporting data; What component was moved; Where the component was moved to; As Left Grapple Elevation when moved; As Found Grapple Elevation when picked up; When the move occurred; Moved From Location; Moved To Location; Forces Applied by the drive unit during the entire move; and Forces Sensed on non-driving IVTM components during the entire move.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Throughout the instant specification, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the terms "about" and "approximately" may, in some examples, indicate a variability of up to ±5% of an associated numerical value, e.g., a variability of up to ±2%, or up to ±1%.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An in-vessel fuel transfer machine, comprising:
a drive assembly, the drive assembly configured to be mounted above a reactor head of a nuclear reactor;
a telescoping guide tube operatively coupled to the drive assembly and extending through the reactor head;
a pantograph mechanism coupled to the telescoping guide tube, the pantograph mechanism comprising:
an upper arm having a first upper arm end and a second upper arm end, the upper arm operatively coupled to the telescoping guide tube at the first upper arm end;
a lower arm having a first lower arm end and a second lower arm end, the lower arm operatively coupled to the telescoping guide tube at the first lower arm end;
a leg coupled to the second upper arm end and the second lower arm end, the leg defining a pathway;
a grapple coupled to the leg, the grapple configured to travel on the pathway; and
a pantograph driveline selectively engageable with the upper arm and the lower arm, the drive assembly configured to rotate the upper arm and lower arm away from the telescoping guide tube;

wherein the grapple is configured to float by disengaging the pantograph driveline to allow the grapple to move in a horizontal plane in response to external forces applied to the grapple.

2. The in-vessel fuel transfer machine as in claim 1, wherein the leg is configured to be moved away from the telescoping guide tube by actuation of the upper arm and lower arm, wherein the leg is further configured to remain parallel with the telescoping guide tube during actuation of the upper arm and the lower arm.

3. The in-vessel fuel transfer machine as in claim 1, wherein the grapple comprises a plurality of fingers that are biased in an orientation that is parallel to the leg.

4. The in-vessel fuel transfer machine as in claim 3, wherein the grapple comprises a shaft that is configured to be slideable to expand the plurality of fingers outwardly.

5. The in-vessel fuel transfer machine as in claim 1, wherein the telescoping guide tube defines a longitudinal axis, and further comprising a rotation motor configured to rotate the in-vessel fuel transfer machine about the guide tube longitudinal axis.

6. The in-vessel fuel transfer machine as in claim 1, wherein the pantograph is configured to remain within a reactor vessel during power operation of the nuclear reactor.

7. The in-vessel fuel transfer machine as in claim 6, wherein the pantograph is permanently installed at a location that places the pantograph submerged within a pool of sodium.

8. The in-vessel fuel transfer machine as in claim 1, further comprising a force sensor coupled to the grapple and configured to sense one or more forces applied to the grapple.

9. The in-vessel fuel transfer machine as in claim 8, further comprising an encoder coupled to the drive assembly and configured to operate the drive assembly to move the pantograph in response to one or more forces applied to the grapple.

10. The in-vessel fuel transfer machine as in claim 9, wherein the encoder is configured to move the grapple to reduce forces applied to the grapple by a deformed core assembly.

11. The in-vessel fuel transfer machine as in claim 9, wherein the encoder is configured to move the grapple in a circuitous path during withdrawal of a deformed core assembly from a core socket within a core of the nuclear reactor.

12. The in-vessel fuel transfer machine as in claim 1, wherein the grapple further comprises a ball joint configured to allow the grapple to freely pivot within a predetermined angular limit.

13. The in-vessel fuel transfer machine as in claim 1, further comprising a ball screw actuator to extend or retract the telescoping guide tube.

14. The in-vessel fuel transfer machine as in claim 13, wherein the ball screw actuator is mounted above the reactor head, the ball screw actuator comprising a sliding shaft penetrating the reactor head at a penetration and a sliding shaft seal at the penetration.

15. The in-vessel fuel transfer machine as in claim 1, further comprising a mechanical core component identification system, the mechanical core component identification system comprising a pawl configured to be selectively biased toward a core component when the core component is held in the grapple, the pawl further configured to identify a core component by reading a series of notches formed in the core component as the core component is rotated by the grapple.

16. An in-vessel fuel transfer machine, comprising:
a drive assembly, the drive assembly configured to be mounted above a reactor head of a nuclear reactor;
a telescoping guide tube operatively coupled to the drive assembly and extending through the reactor head;
a pantograph mechanism coupled to the telescoping guide tube, the pantograph mechanism comprising:
an upper arm having a first upper arm end and a second upper arm end, the upper arm operatively coupled to the telescoping guide tube at the first upper arm end;
a lower arm having a first lower arm end and a second lower arm end, the lower arm operatively coupled to the telescoping guide tube at the first lower arm end;
a leg coupled to the second upper arm end and the second lower arm end, the leg defining a pathway;
a grapple coupled to the leg, the grapple configured to travel on the pathway; and
a force sensor coupled to the grapple and configured to sense one or more forces applied to the grapple.

17. The in-vessel fuel transfer machine as in claim 8, further comprising an encoder coupled to the drive assembly and configured to operate the drive assembly to move the pantograph in response to one or more forces applied to the grapple.

18. The in-vessel fuel transfer machine as in claim 9, wherein the encoder is configured to move the grapple to reduce forces applied to the grapple by a deformed core assembly.

19. The in-vessel fuel transfer machine as in claim 9, wherein the encoder is configured to move the grapple in a circuitous path during withdrawal of a deformed core assembly from a core socket within a core of the nuclear reactor.

20. An in-vessel fuel transfer machine, comprising:
a drive assembly, the drive assembly configured to be mounted above a reactor head of a nuclear reactor;
a telescoping guide tube operatively coupled to the drive assembly and extending through the reactor head;
a pantograph mechanism coupled to the telescoping guide tube, the pantograph mechanism comprising:
an upper arm having a first upper arm end and a second upper arm end, the upper arm operatively coupled to the telescoping guide tube at the first upper arm end;
a lower arm having a first lower arm end and a second lower arm end, the lower arm operatively coupled to the telescoping guide tube at the first lower arm end;
a leg coupled to the second upper arm end and the second lower arm end, the leg defining a pathway;
a grapple coupled to the leg, the grapple configured to travel on the pathway; and
a ball joint configured to allow the grapple to freely pivot within a predetermined angular limit.

21. The in-vessel fuel transfer machine as in claim 20, further comprising a ball screw actuator to extend or retract the telescoping guide tube.

22. The in-vessel fuel transfer machine as in claim 21, wherein the ball screw actuator is mounted above the reactor head, the ball screw actuator comprising a sliding shaft penetrating the reactor head at a penetration and a sliding shaft seal at the penetration.

* * * * *